United States Patent
Tripp et al.

(10) Patent No.: US 9,384,519 B1
(45) Date of Patent: Jul. 5, 2016

(54) FINDING SIMILAR IMAGES BASED ON EXTRACTING KEYS FROM IMAGES

(71) Applicant: Zazzle.com, Inc., Redwood City, CA (US)

(72) Inventors: Charles Tripp, Menlo Park, CA (US); Jason Li, Newark, CA (US)

(73) Assignee: Zazzle Inc., Redwood City, CA (US)

( * ) Notice: Subject to any disclaimer, the term of this patent is extended or adjusted under 35 U.S.C. 154(b) by 229 days.

(21) Appl. No.: 14/104,152

(22) Filed: Dec. 12, 2013

(51) Int. Cl.
  *G06K 9/00* (2006.01)
  *G06T 1/00* (2006.01)
(52) U.S. Cl.
  CPC .................................... *G06T 1/0021* (2013.01)
(58) Field of Classification Search
  CPC combination set(s) only.
  See application file for complete search history.

(56) References Cited

U.S. PATENT DOCUMENTS

| | | | |
|---|---|---|---|
| 6,618,510 B1* | 9/2003 | Umiji | G06K 9/3241 382/260 |
| 2005/0135654 A1* | 6/2005 | Li | G06T 1/005 382/100 |
| 2005/0165690 A1* | 7/2005 | Liu | G06T 1/0028 705/57 |
| 2009/0226056 A1* | 9/2009 | Vlachos | G06T 1/0071 382/128 |

\* cited by examiner

*Primary Examiner* — Alex Liew
(74) *Attorney, Agent, or Firm* — Hickman Palermo Becker Bingham LLP

(57) ABSTRACT

Techniques for extracting keys from digital images data are presented. In an embodiment, a method comprises receiving a particular image; using a computer, determining a plurality of characteristics specific to contents of the particular image; using the computer, generating, based at least in part on the plurality of characteristics, a plurality of coefficients; generating a plurality of values by applying a particular function to the plurality of coefficients; selecting, from the plurality of values, a subset of values, each value in the subset satisfying a particular threshold requirement; based, at least in part on the subset of values, generating one or more keys, each of which uniquely encodes data included in the subset of values; generating and storing metadata that associates each of the one or more keys with the particular image.

26 Claims, 15 Drawing Sheets

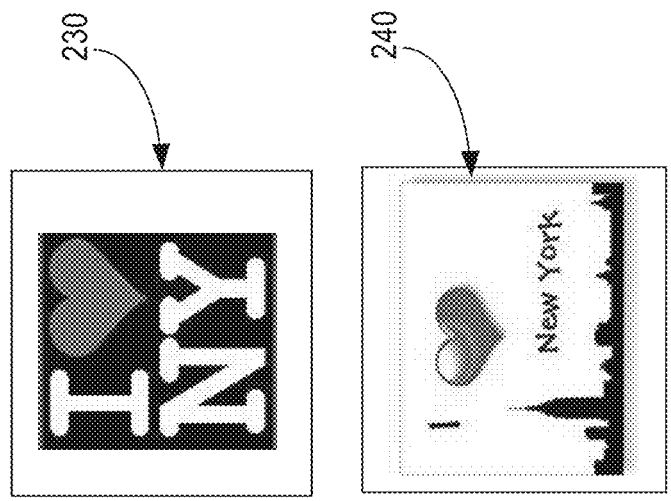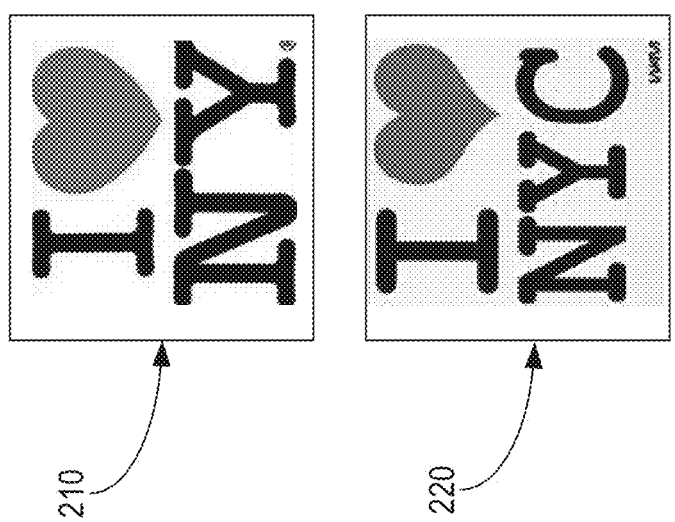
Fig. 2

```
protected override ComplexF transform(SimpleColor color)
{
    byte value = color.value();
    //float fValue = color.value() / 255.0f;
    float fValue = color.valueWithAlpha() / 255.0f;

byte min = color.minimum();
    int chroma = value - min;
    float fChroma = chroma;

if (chroma > 64)
    {
        int den = (int)color.g - color.b;
        int numer = (int)color.r - color.g - color.b;
        double hue = Math.Atan2(2 * numer, Math.Sqrt(3) * den) + Math.PI;
        hue = Byte.MaxValue * ImageUtil.wrap(hue * 2.0 / Math.PI);

fChroma += (float)hue;
        fChroma = fChroma - (float)Math.Floor(fChroma);
    } return new ComplexF(fValue, fChroma);
}
```

```
/// <summary>
/// Makes an array into a shape number by mutating it so that it
/// and it's reverse have the same shape number.
/// </summary>
/// <param name="shapeCode"></param>
public static void makeIntoAShapeNumber(byte[] shapeCode)
{
    int count = shapeCode.Length;
    int center = count / 2;
    for (int i = 0; i < center; i++)
    {
        int delta = shapeCode[i] - shapeCode[count - 1 - i];
        if (delta > 0)
            return;
        if (delta < 0)
        {
            Array.Reverse(shapeCode);
            return;
        }
    }
}
```

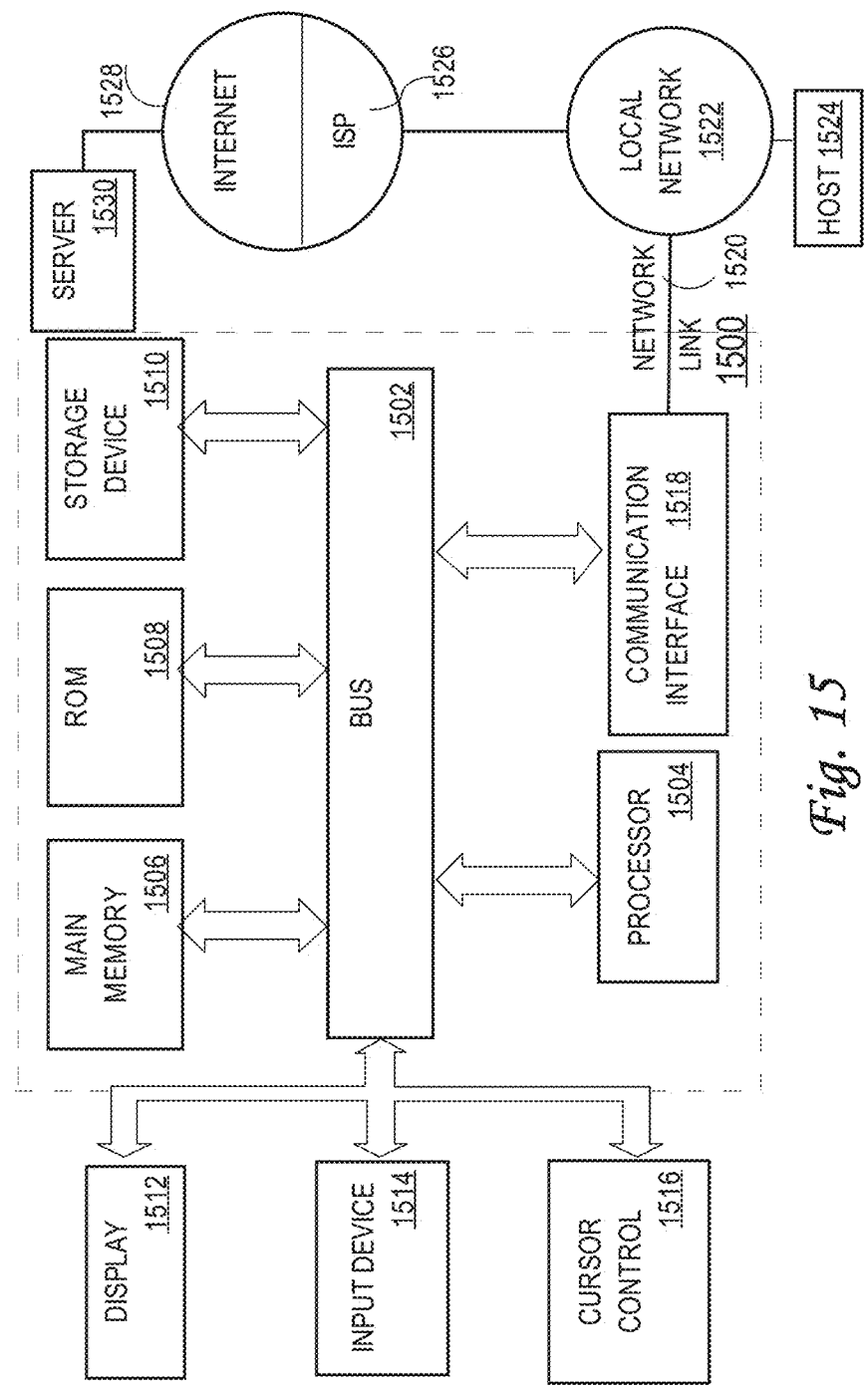

FINDING SIMILAR IMAGES BASED ON EXTRACTING KEYS FROM IMAGES

COPYRIGHT NOTICE

A portion of the disclosure of this patent document contains material which is subject to copyright protection. The copyright owner has no objection to the facsimile reproduction by anyone of the patent disclosure as it appears in the U.S. Patent & Trademark Office patent files or records, but otherwise reserves all copyright rights whatsoever. Copyright © 2013 Zazzle, Inc.

FIELD OF THE DISCLOSURE

The present disclosure generally relates to computer-based techniques for processing digital image data. The disclosure relates more specifically to techniques for searching for and finding similar digital images based on extracting keys from digital images.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The ability to quickly generate indicators that uniquely identify certain characteristics of a digital image is important in image processing and image classification. The indicators may be used to group the images based on similarities between the images, and to identify groups containing similar images. The groupings of the images may be captured using an index that maps the indicators onto the corresponding images. However, generating such an index for a vast amount of images in a relatively short period of time is usually unachievable using conventional approaches.

Indexes generated for digital images may be used in a variety of applications. For example, an index may be used to determine whether a newly received image is similar to any of the already classified images. Upon receiving a new image, an indicator may be generated for the image and the generated indicator may be compared with the indicators that have been already generated for other images. The comparison may allow determining whether the received image is in some sense similar to the other images.

However, making such a determination using conventional approaches is often not only inefficient, but also unreliable. For example, the indicators generated using the conventional approaches are rarely invariant to the image rotation or resizing. Thus, such indicators are seldom helpful in determining whether a received image is indeed similar to any of the already classified images. For example, it may be difficult to determine whether an image created by a competitor infringes on a trademark registered to another party if the competitor's design is merely a rotated copy of the registered mark, or it may be difficult to locate similar digital images in a database that contains a large number of digital images that are slightly different yet generally similar.

SUMMARY OF THE DISCLOSURE

The appended claims may serve as a summary of the disclosure.

BRIEF DESCRIPTION OF THE DRAWINGS

In the drawings:

FIG. 2 illustrates examples of image similarity issues demonstrated using example images.

FIG. 4 illustrates an example programming code for using the Forward Fourier Transform to determine a plurality of coefficients.

FIG. 13 illustrates an example code for transforming attribute information into a shape number.

FIG. 15 illustrates a computer system with which an embodiment may be implemented.

DETAILED DESCRIPTION

Figure 1:
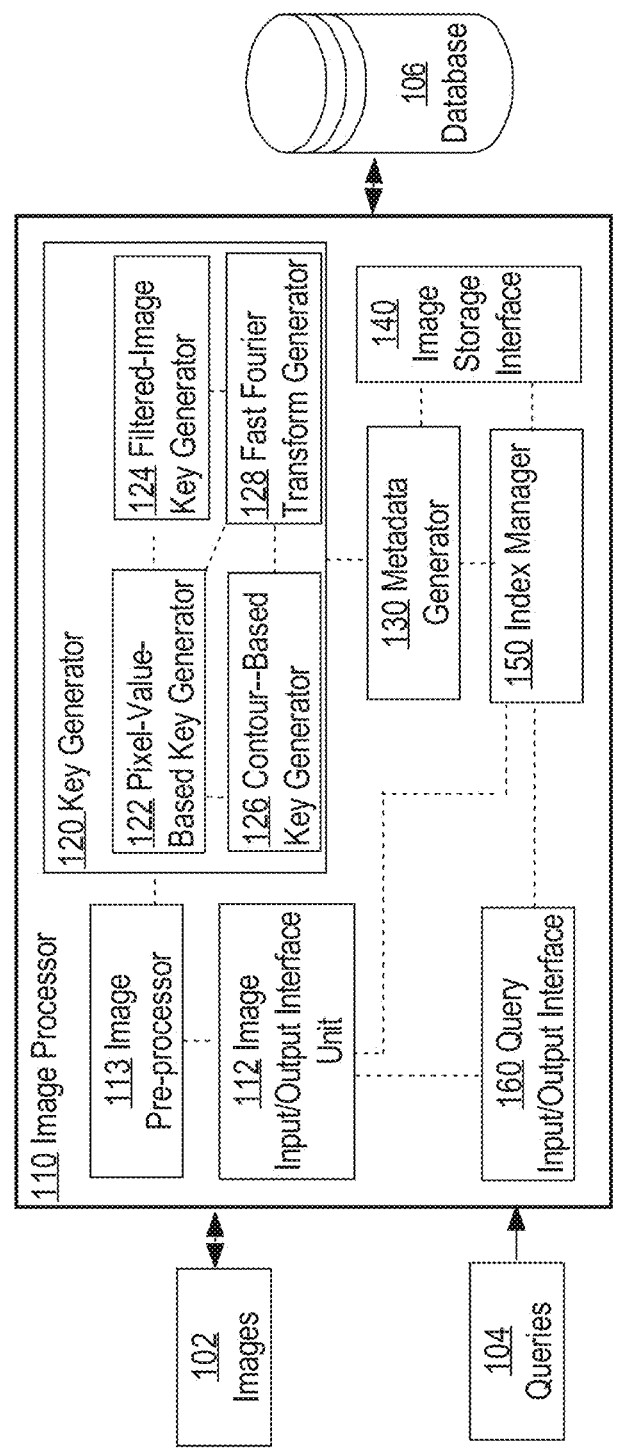
FIG. 1 illustrates an image processor system in which an embodiment may be used.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

Various aspects of the invention are described hereinafter in the following sections:

I. OVERVIEW
II. SYSTEM ARCHITECTURE
III. EXTRACTING KEYS FROM IMAGES
   1. Similarities between Images
   2. Extracting Keys from Images
IV. EXTRACTING PIXEL-VALUE-BASED HASH KEYS
   1. Image Pre-Processing
   2. Determining Complex Numbers for Image Pixels
   3. Determining Low Frequency Components using Fourier Transform
   4. Generating Hash Keys Based on Low Frequency Components
   5. Determining Metadata
   6. Storing Metadata in Association with Image
   7. Updating Index Information V. EXTRACTING HASH KEYS FROM FILTERED IMAGES
   1. Image Pre-Processing
   2. Image Filtering
   3. Generating Hash Keys for a Filtered Image and Post-Processing
VI. EXTRACTING HASH KEYS FROM IMAGE CONTOURS
   1. Capturing Image Contour Information
   2. Generating Hash Keys from Image Contour Information
VII. EXAMPLE IMPLEMENTATIONS
VIII. ENHANCEMENTS
IX. IMPLEMENTATION MECHANISMS I. General Overview Techniques are described for extracting keys from digital image data and using the keys in search tasks to identify digital images that are similar. Techniques for extracting various types of keys and using various approaches are disclosed. For example, some keys may be extracted from pixel information of the image data. Other keys may be extracted from a filtered image generated from the image data. Other keys may be extracted from a contour image generated from the image data.

In an embodiment, a method comprises receiving data for a digital image. The data may encode the digital image using any of digital formats, including the TIFF, GIF, PDF, and PNG formats, and the like.

In an embodiment, the digital image is pre-processed. The pre-processing transforms the image to a standard without changing characteristics or contents of the image and preserves the characteristics of the digital image. The pre-processing may include performing various types of transformation of the digital image, including image resizing, image aspect-ratio adjustment, transparency-based color-adjustment, color accentuation, or color de-accentuation. For example, if a digital image depicts a red square located at the bottom-left corner of the image, then a pre-processed image may depict the same red square; however, the red square may be centered in the pre-processed image. In an embodiment, a method for extracting keys from images is invariant of the image rotation, resizing, and the like, so the keys extracted from either the original image or the pre-processed image are most likely to be identical.

A plurality of characteristics that are specific to contents of the image is determined. The characteristics may be determined from for example pixel values associated with the pixels of the pre-processed image. Such characteristics may be used to generate pixel-value-based keys for the image. Other characteristics may be determined from pixel values associated with the pixels of a filtered image generated from the pre-processed image. Such characteristics may be used to generate filtered-image keys. Other characteristics may be determined from contour values associated with the pixels of a contour image generated from the pre-processed image. Such characteristics may be used to generate contour-image keys.

In an embodiment, characteristics determined for a pre-processed image are adjusted based on transparency coefficients associated with the pixels of the image. For example, if a pixel of the image is represented using a red component value (R), a green component value (G), a blue component value (B), and an alpha (transparency) component value (A), then each of the R, G, B values may be adjusted according to the transparency value (A). Hence, if a particular pixel is represented as R, G, B, A values of {255, 255, 255, 100}, then for the purpose of extracting keys from the image containing the particular pixel, the R, G, B values may be adjusted to {255/100, 255/100, 255/100}.

Once the characteristics are determined and adjusted if needed, the characteristics are used to determine a plurality of coefficients, to which a particular function may be applied to determine a plurality of values. The characteristics may be represented as complex numbers, each of which has a real component and an imaginary component. The complex numbers may be provided as input to the particular function, such as the Forward Fourier Transform (FFT), to generate output comprising the plurality of values.

In an embodiment, the FFT is applied to a plurality of complex numbers to generate output comprising a plurality of values. Each of the plurality of values may be represented as a complex value. Each of the complex values may be represented as an amplitude component and a frequency component. The complex values may be processed by selecting those complex values for which the frequency component does not exceed a particular frequency. The complex values that satisfy this requirement may be referred to as values associated with low frequency components. The low frequency components are used to generate one or more keys.

In an embodiment, a pre-processed image is filtered to generate a filtered image, and one or more keys are extracted from the filtered image. A filtered image is an image in which contours are accentuated, and color values and image gradient values are reduced. For example, the pre-processed image may be filtered by accentuating or sharpening the contours of the image. Once a filtered image is generated, the keys may be extracted directly from the filtered image, or the filtered image may be processed using the FFT before the keys are extracted.

In an embodiment, a pre-processed image is processed to generate a contour image, and one or more keys are extracted from the contour image. A contour image represents the contours identified in the image. Various methods may be employed to generate a contour image. For example, a contour image may be generated by executing an iterative process of identifying whether any two pixels in the image belong to a particular contour in an image. The iterative process may be repeated to refine the belief that the two or more pixels belong to the particular contour. The process may be repeated until the belief meets a certain threshold requirement.

From the plurality of values, a subset of values may be selected to generate one or more keys. Selecting the subset of values may be performed using a threshold value, and comparing values of the plurality of values with the threshold value. The subset of values may contain the values from the plurality of values that do not exceed the threshold value. Once a contour image is generated, the keys may be extracted directly from the contour image, or the contour image may be processed using the FFT before the keys are extracted.

Based, at least in part on the subset of values that were generated from a pre-processed image, a filtered image, a contour image, or otherwise, one or more keys may be generated. Each of the generated keys uniquely encodes data included in the subset of values. For example, a particular key may uniquely capture a subset of pixel-based values of the pixels included in the particular digital image. Another key may uniquely capture a subset of values of a filtered image generated from the particular digital image. Other key may uniquely capture a subset of values of a contour image generated from the particular digital image.

In an embodiment, a key extracted from an image is hashed. Various hashing algorithms may be used. For example, a hashing algorithm used to generate hashed keys may include selecting a seed value for each type of keys or for each type of images, and using the seed value to generate a hash value for the key.

In an embodiment, metadata is generated. Metadata associates a key with a digital image from which the key was extracted. For example, if a particular key was extracted from a particular digital image, then metadata may contain an association of the particular key and the name or the location of the particular digital image. If two or more keys were extracted from the particular digital image, then the metadata may contain two or more association, each of which associates a key from the two or more keys and the name or the location of the particular digital image.

In an embodiment, one or more indexes are generated for the images. For example, the keys extracted from the images may be used to generate an inverse index of the images stored in a database. Upon receiving a new image, one or more new image keys may be extracted using the described approach. The extracted new image keys may be compared with the keys that have been already extracted from the images and stored in the index. If at least one match is found, then the new image appears to be similar in some aspect to at least one image stored in the database. This approach may be particularly useful in determining whether a newly designed image is in any way similar to any of the designs that have been already created and stored in the database.

In an embodiment, the approaches herein may be useful in modifying or fine tuning existing logos and other graphical designs so that they do not appear similar to the already created images. For example, a query may be issued to the system maintaining a database of images. The query may request determining, and if so, providing one or more images that are similar in certain context to a new image. The system may extract one or more keys from the new image, and compare the extracted keys with the keys stored in an index generated for the images stored in the database of images. If a match between the extracted keys and the keys stored in the index is found, then the image or images corresponding to the matched keys are provided as a response to the query to indicate the images that appear to be similar to the new image. Thus, an image designer may continue fine tuning the new image until the new image becomes dissimilar to the images stored in the database.

The foregoing and other features and aspects of the disclosure will become more readily apparent from the following detailed description of various embodiments.

II. Example System Architecture

FIG. 1 illustrates an example computer-based image processor system in which an embodiment may be used. In an embodiment, image processor system 110 comprises an image input/output interface unit 112, an image pre-processor 113, a key generator 120, a metadata generator 130, an image storage interface 150, an index manager 150, and a query input/output interface 160. In some embodiments, image processor system 110 may comprise additional components and units that are not depicted in FIG. 1. In other embodiments, image processor system 110 may contain some, but not all units depicted in FIG. 1. For example, some of the units of image processor 110 depicted in FIG. 1 may be combined into one unit not depicted in FIG. 1. Each of the functional units in FIG. 1 may be implemented, in various embodiments, using electronic digital logic, a special-purpose computer that includes digital logic configured to perform the functions that are described, and/or a general-purpose computer coupled to memory or a storage device storing instructions which when loaded and executed cause performing the functions that are described.

In an embodiment, image processor 110 receives various inputs. For example, image processor 110 may receive one or more images 102 along with one or more queries 104. A query 104 may indicate the type of processing to be performed with respect to an image 102. Image 102 may be provided in a variety of formats, and query 104 may be specified in compliance with a predetermined vocabulary or a scheme. For example, query 104 may specify a request to extract one or more keys from image 102, and store the extracted keys in a database 106. Another query 104 may specify a request for determining whether any of the images already stored in database 106 is in some sense similar to image 102.

In an embodiment, image processor system 110 uses image input/output interface unit 112 to receive images 102. The received images may be digital images expressed using any of known digital image formats. For example, image input/output interface unit 112 may be configured to process images in the TIFF, GIF, PDF, PNG and other formats.

Image processor system 110 may use image input/output interface unit 112 to output an image 102. For example, image input/output interface unit 112 may be used to display intermediate images generated as one or more keys are extracted from an input image. Furthermore, image input/output interface unit 112 may be used to display the images for which keys have been already extracted, or the images for which the same keys have been extracted.

Query input/output interface 160 may be used to receive queries 104 issued to image processor 110. For example, query input/output interface unit 160 may be configured to receive a query to request extracting one or more keys from an input image 102, or a query to request checking whether any of the images already stored in database 106 is similar in some sense to an input image 102.

Image processor system 110 may use image storage interface 150 to transmit for storing images from which one or more keys have been extracted, and for storing metadata that associates the extracted keys with the images from which the keys have been extracted. Furthermore, image storage interface 150 may be used to send for storing an index generated based on the extracted keys and the metadata. Moreover, image storage interface 150 may be used to retrieve the images, extracted keys, information from the index and other information related to the key extraction.

Index manager 150 may be configured to manage one or more indexes generated based on keys extracted from images. The indexes may include forward indexes, inverted indexes and other indexes. A forward index represents associations between individual images and the keys extracted from the respective images. An inverted index represents associations between individual keys and the images from which the respective key was extracted.

Index manager 150 may be configured to receive a request for retrieving from database 106 one or more images from which a particular key has been extracted, or for retrieving from database 106 one or more keys which have been extracted from a particular image stored in database 106. Furthermore, index manager 150 may be configured to manage and update the indexes stored in database 106 and perform lookups for the information stored in database 106.

Image pre-processor 113 may be configured to pre-process an input image 102. The pre-processing may include resizing the image, rotating the image, adjusting an image aspect-ratio, adjusting a transparency-based color values for pixels of the image, accentuating color values for the pixels, and de-accentuating the color values for the pixels.

Key generator 120 may be configured to extract one or more keys from image 102. One of the characteristics of key generator 120 is the ability to extract keys from images in such a way that the keys are invariant of the image resizing, rotating, and the like. Thus, if a first input image contains a red square centered in the middle of the first image, and a second image contains the same red square but located off-center in the second image, then key generator 120 is expected to generate the same keys for both the first and second images. Hence, the keys generated by key generator 120 for images that are obtained from the first image by rotating, resizing or similar transformation of the first image, are expected to be the same. The invariance of the keys generated by key generator 120 is not impacted by pre-processing of image 102.

In an embodiment, key generator 120 comprises a pixel-value-based key generator 122, a filtered-image key generator 124, a contour-based key generator 126, and a FFF generator 128. Other embodiments of key generator 120 may include additional components or units.

Pixel-value-based key generator 122 is configured to extract one or more keys from pixel values associated with the pixels of the image. The image may be a pre-processed image generated by image pre-processor 113.

Pixel-value-based key generator 122 may extract the keys from RGBA values associated with the pixels of the image. In particular, pixel-value-based key generator 122 may use the RGBA values associated with the pixels, convert the RGBA values to complex numbers having a real_component and an imaginary component, and process the complex numbers to obtain a plurality of coefficients indicative of certain characteristics of the image. The processing may include invoking a FFT Generator to perform the FFT on the complex numbers and to obtain the plurality of coefficients, where each of the coefficients is represented by a pair containing an amplitude_component and a frequency_component.

In an embodiment, pixel-value-based key generator 122 may process the plurality of coefficients by selecting those coefficients for which the value of the frequency_component does not exceed a certain threshold value. The selected coefficients are referred to as low frequency coefficients. Pixel-value-based key generator 122 may use the low frequency coefficients to generate one or more keys.

In an embodiment, pixel-value-based key generator 122 generates the keys as hashed values. Any hashing function may be used for the purpose of generating the keys. Pixel-value-based key generator 122 may use a hash function which selects a different seed value for each type of the key or for each type of the image.

Filtered-image key generator 124 is configured to extract one or more keys from a filtered image obtained from an input image. The input image may be a pre-processed image generated by image pre-processor 113. The filtered image may be generated by filtered-image key generator 124 and may include a certain type of the image processing that is not included in the image pre-processing described above. For example, filtering of an image may include the processing that causes accentuating of the lines in the image, or ignores color information and gradual changes in gradients for the image. Such processing may allow deriving a filtered image that captures those features of the input image that are color-independent and frequency-value independent. For example, if an input image represents a red rectangle, then a filtered image, obtained from the input image may ignore the color information of the image; however, it may capture the shape information of the rectangle depicted in the image.

Filtered-image key generator 124 may generate one or more keys from pixel information associated with the pixels of a filtered image. The keys may be generated either directly from the pixel information of the filtered image, or from the information obtained once a FFT generator 128 performs the FFT on the pixel information. In the first approach, the pixel information of the filtered image may be used directly to generate the keys, and then the keys may be hashed. In the second approach, the pixel information is processed to determine complex numbers, having real_components and imaginary_components. Then, the complex numbers are processed by FFT generator 128 by applying the FFT to the complex numbers, and the output generated by FFT generator 128 is used to generate keys, which are then hashed. Other approaches for generating hash keys from filtered images may also be applied.

Contour-based key generator 126 is configured to extract one or more keys from a contour image obtained from an input image. The input image may be a pre-processed image generated by image pre-processor 113. The contour image may be generated by contour-based key generator 126 and may include a certain type of the image processing that is not included in the image pre-processing described above. The contour image may be generated by for example, executing an iterative process for detecting contours of the objects depicted in the image. The iterative process includes a scanning of the image according to multiple different patterns, and refining one or more belief values associated with the pixels of the image. The refining may be performed by propagating the belief values. This may be achieved by comparing distributions of pixels in segments and considering whether the pixels appear to be a part of the same segment, a part of a different segment, or whether the pixels are not part of any segment. Once the refining of the belief values does not significantly improve the belief values, it is assumed that that an association between the pixels and respective segments is established. The identified segments are considered the edges or contours of the objects depicted in the image. The contour image is determined based on the identified contours.

Contour-based key generator 126 may generate one or more keys from the pixel information associated with the pixels of the contour image. The keys may be generated either directly from the pixel information of the contour image, or from the information obtained once a FFT generator 128 applies the FFT to the pixel information and generates output consisting of complex numbers. In the first approach, the pixel information of the contour image may be used directly to generate hash keys. In the second approach, the pixel information is processed by FFT generator 128 to determine complex numbers, having real_components and imaginary_components. Then, the complex numbers are processed using the FFT and the output values are used to generate hash keys. Other approaches for generating hash keys from filtered images may also be applied.

Image processor 110 may comprise additional units configured to extract keys by combining any of the above described approaches.

Metadata generator 130 may be configured to generate metadata. Metadata may be generated for the keys extracted from images and for the images from which the keys have been extracted. For example, metadata may be generated for each of the keys extracted from a particular image and the metadata may represent one or more associations between the extracted keys and the particular image. According to another example, metadata may be generated for a particular key, and represent one or more associations between the particular key and one or more images from which the particular key has been extracted. According to other example, metadata may be generated for two or more keys, all of which were extracted from one or more images, and represent one or more associations between the two or more keys and the one or more images from which the two or more keys have been extracted.

Metadata generator 130 may be configured to send metadata to index manager 150 for further processing. Alternatively, metadata generator 130 may use image storage interface 150 to transmit metadata for storing at database 106.

Index manager 150 may be configured to receive metadata and process the metadata to generate one or more indexes. The indexes may include forward indexes and inverted indexes, and may represent associations between the keys and the images for which the keys were generated. The indexes may be used to organize the images stored in database 106, and to answer queries 104 issued to image processor 110. Index manager 150 may update or regenerate the indexes as new images are processed and new keys are generated.

III. Extracting Keys from Images

Photographs, images, drawings and other visual depictions may be analyzed and categorized based on apparent similarities between them. For example, two images that depict similar concepts or words may be considered similar to each other, while two other images that do not contain similar concepts or words may be dissimilar.

In an embodiment, determining similarities between images includes automated processing of the images to extract keys from the images, and using the keys to determine whether the images are similar. A key may indicate certain characteristics of an image. Keys extracted from two images may be compared to determine whether the keys are the same, and if so, to determine that the corresponding images are similar in some sense. The extracted keys capture certain image characteristics that are independent of color schemes, font schemes, symbol schemes and other elements specific to the images. Some examples are depicted in FIG. 2.

1. Similarities Between Images

FIG. 2 illustrates examples of image similarities issues demonstrated using example images 210, 220, 230, 240. Image similarities may be determined using various criteria, and the criteria may be expressed using various keys extracted from the images. Certain keys are designed to capture image similarities determined in terms of colors and shapes; other keys may capture image similarities in terms of expressions or meanings. Various image similarities issues are demonstrated using the example images 210-240.

Each of images 210-240 contains depiction of an image in the general format "I ♥ NY." However, the depictions are represented using different graphical designs in each of images 210-240. For example, both images 210 and 230 depict "I ♥ NY." Certain details shown in images 210, 230 are depicted using different colors. For example, image 210 contains a white background and black letters, while image 230 contains a black background and white letters.

In some applications, both images 210, 230 are considered similar. For example, if image 210 corresponds to a registered trademark, then image 230 may be considered as an infringing image because image 230 may be similar to image 210 for the purpose of establishing a trademark infringement. However, if neither of images 210, 230 corresponds to a registered mark, then images 210, 230 may be considered dissimilar. For example, such images may be used as different decals imprinted on shirts, mugs and the like.

In some implementations, images 210-220 may be considered similar; in other implementations, images 210-220 may be considered dissimilar. For example, since "NY" corresponds to "New York," and "New York" is often referred to as "New York City," both images 210-220 express the same message. However, images 210-220 may be considered dissimilar if the colors of the background are taken into consideration. Since image 210 contains a white background and image 220 contains a gray background, images 210-220 may be considered as dissimilar.

In some implementations, images 230-240 may be considered similar; in other implementations, images 230-240 may be considered dissimilar. For example, since "NY" corresponds to "New York," the expression "I ♥ NY" and the expression "I ♥ New York" appear to convey the same message. Thus, images 230-240 may be similar. On the other hand, images 230-240 may be dissimilar because they have different backgrounds—image 230 has a black background, while image 240 has a white background containing a black city skyline.

2. Extracting Keys from Images

A key extracted from an image is usually a short vector of bits generated based on some unique properties or characteristics of the image. The key may be viewed as a unique summary of the image and may be useful in an image indexing, image authentication and pattern recognition.

In an embodiment, key extraction includes selecting the proper types of unique properties and characteristics of the image and selecting the proper types of processing on the selected properties and characteristics. For example, it may be important that a key extracted from an image be invariant under transformations of the image, such as an image resizing, rotating, scaling or brightening. Such transformations usually insignificantly alter the visual content of the image. It may also be important that the keys, extracted from two images containing different contents, be significantly different, and thus contain different vectors of bits. Therefore, the quality and usefulness of the extracted keys to a large degree depends on the selection of the input information for generating the keys and the selection of the type of processing of the selected input information.

Keys may be extracted from different properties and characteristics of an image. For example, a key may be extracted from the information capturing shapes of the contours depicted in an image. A key may also be extracted from the information describing relative links of the sides or corners in an image. Such a key may capture proportions between the sides of the contours or ratios between the lengths of the different sides. A key may also be extracted from the information describing angles between the edges or sides of the objects represented in the image. The information representing or describing the shapes, contours, links or angles may be encoded in a shape number. Once a shape number is determined, the shape number may be used to generate a hash value. The hash value may be used as a value of the extracted key.

Keys extracted from images may be used in a variety of applications. For example, the keys may be used to index the images and to generate an index of the images. An index of the images may be organized as an inverted index. Such an index may be similar to inverted indexes used by text search engines. Generating an inverted index may be accomplished by developing software code that utilized open source modules and plugins, including Java-based indexing and search technology from for example, Lucene Core Inc., or others.

IV. Extracting Pixel-Value-Based Hash Keys

In an embodiment, keys extracted from images are pixel-value-based hash keys. Pixel-value-based hash keys generated for images are invariant under transformation of the images. The keys capture the properties and characteristics of the images in such a way that the transformations such as a rotation, scaling, color adjustment and the like, do not change the value of the generated key.

Pixel-value-based hash keys capture color and transparency values of the pixels of the images. Although the pixel-value-based hash keys capture visual characteristics of the images, the pixel-value-based hash keys are not perceptual-keys. One of the drawbacks of the traditional perceptual keys is that they are not invariant under transformations of the image, such as an image resizing, rotating, scaling or brightening. The problems with traditional keys are rooted in the way the traditional perceptual keys are generated. For example, the traditional perceptual keys generated for two images, each of which represents the same object but in a different color, are most likely different because the traditional perceptual keys take into consideration the color value distribution. Generating a traditional perceptual key involves considering color values for all pixels, generating average median values or brightness values for the pixels or the neighborhood of pixels, concatenating the generated bit values and computing hash values from the concatenated bit values.

In contrast, the presented pixel-value-based hash keys are invariant under transformations of the images. For example, the pixel-value based hash keys generated for two images, each of which represents the same object but in a different color, most likely are different, and thus unique.

Figure 3:
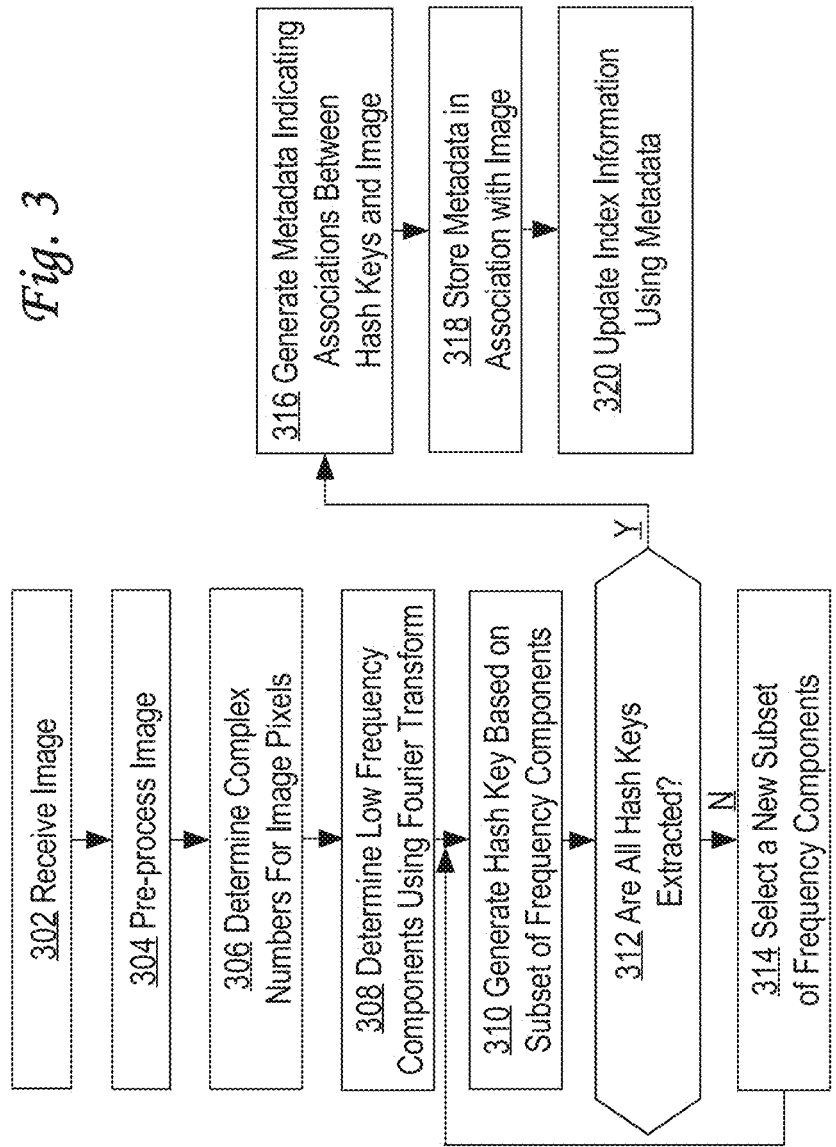
FIG. 3 illustrates a method for extracting pixel-value-based keys from a digital image.

FIG. 3 illustrates a method for extracting pixel-value-based keys from a digital image. In step 302, an input image is received. An input image may be any type of a digital image and may be represented in any of known digital image formats. For example, an input image may be a TIFF file, a GIF file, a PDF file, or a PNP file. Other types of input image may also be included.

In step 304, the process determines whether pre-processing of a received input image is recommended, and if so, the image is pre-processed.

1. Image Pre-Processing

An image pre-processing step allows adjusting or modifying certain properties of an image. The adjustments and modifications include those changes that do not influence values of the extracted keys. Examples of the adjustments and modifications include an image resizing, an aspect-ratio adjusting, transparency-based color-adjustment, and color accentuation/de-accentuation. For example, since generating pixel-value-based hash keys is independent of the size of the image, it may be desirable to define a default size of the image, and resize the received image to the default size. By pre-processing the received images to the default size, the process of extracting the keys may be simplified and uniformly applied.

Pre-processing of an image may include cropping the image by removing from the image the pixels that do not contribute significantly to the content of the image. For example, if an image depicts a white background and a black square positioned in a left bottom quadrant of the image, then, the portion of the white background that contains no objects may be cropped.

Pre-processing of an image may include converting an image to an image having a default size or a default aspect ratio. A default size and default aspect ratio may depend on the implementation and may be different for each type of keys. A default size may be selected based on empirical data or recommendations from software programmers. Typically, a default size is indicated by a count of rows and a count of columns in the image. Typically, each count is represented as a power of "2." For example, a received image may be converted to a square image, such as a 128×128 image (having 128 rows and 128 columns), or a 160×160 image (having 160 rows and 160 columns). Converting the received images to square images usually helps to optimize a key extraction process.

However, in some implementations converting a received image to a square image may not be recommended. This may occur for the images that have an aspect ratio that is extremely high or low. For example, an image depicting a very tall tree may have an extremely high aspect ratio. Converting such an image to a square image may be undesirable. However, it may be recommended to resize the image to an image having an aspect ratio of 5/6.

Pre-processing of an image may also include performing a color accentuations and de-accentuation of an image. It has been observed that the human perception and ability to distinguish between dark red colors and dark green colors is rather limited. Hence, some individuals are unable to differentiate between the dark red colors and dark green colors. By accentuating the respective colors in the image, the ability to differentiate those colors in the images may be improved. Also, it has been observed that human perception of certain colors, especially in the areas of the image containing many details, may be de-accentuated without significantly altering the content of the image.

Pre-processing of an image may also include performing a color adjustments based on a transparency component in a pixel definition. This process may be performed for images that contain transparency characteristics. Such images include the images in which pixels are defined not only in terms of color, or hue and chroma, but also in terms of transparency. An example of an image that contains transparency characteristics is an image that contains pixels defined in terms of R, G, B components and an alpha component ("A" or "a") representing transparency. An image containing the R, G, B, and A components is referred to as an RGBA image, and the model for representing digital images using the R, G, B, and A components is referred to as an RGBA color model.

The transparency component may be considered as a fourth color component. The transparency component may be any integer number selected from a range of [0, 255]. Depending on the format of the received image, in an RGBA image, "0" may denote "completely opaque," and "255" denotes "completely transparent," while in a PNP image, "0" may denote "completely transparent," and "255" may denote "completely opaque." In either case, the transparency component for each pixel may be used to adjust the color value of the pixel.

Each of the R, G, B, and A components also may be represented as an integer in the range [0, 255]. For example, if a pixel is defined as {0, 0, 0, 0}, then the pixel is a completely opaque black pixel. However, if a pixel is defined as {255, 255, 255, 255}, then the pixel is a completely transparent white pixel.

In images represented in the PNG or GIF formats, the transparency component may be determined as an integer number from a range of [0, 255] in such a way that if a transparency component is "0," then the pixel color is completely transparent, but if a transparency component is "255," then the pixel color is completely opaque.

In an embodiment, a transparency component is used to pre-process an image. For example, the transparency component of a pixel may be used to alter the RGB values for the pixel. Alternatively, or in additional to, a transparency component may be used to correct pixel values for generating complex numbers.

2. Determining Complex Numbers for Image Pixels

In step 306, a complex number is determined for each pixel of the pre-processed image.

A real component and an imaginary component of a complex number for a pixel may be computed using a variety of ways. For example, a real component for a pixel may be computed from R, G, B and A values associated with the pixel.

In an embodiment, a real component of a complex number for a pixel is computed by determining a maximum value of $\{R, G, B\}$ associated with the pixel, performing a transparency correction for the maximum value using a transparency component, and normalizing the resulting value. For example, a real component for a pixel having associated RGBA values as $\{100, 150, 255, 200\}$ may be computed as follows:

1. Determine a maximum value of $\{R, G, B\}$ associated with the pixel. In the provided example, the maximum value may be computed using the following formula:

$$\text{maximum\_value} = \max(R,G,B) = \max(100,150,255) = 255. \quad (1)$$

2. Perform a transparency correction for the maximum value. In the provided example, the correction may be performed using the following formula:

$$\text{corrected\_value} = (\text{maximum\_value}*(255-A))=255*(255-200)=15{,}025. \quad (2)$$

3. Normalize the corrected value. In the provided example, the normalized value may be obtained using the following formula:

$$\text{normalized\_value} = \text{corrected\_value}/255 = 15{,}025/255 = 55. \quad (3)$$

4. Use the normalized_value as a real_component of the complex number determined for the pixel. In the provided example, the real-component of the complex number may be determined using the following formula:

$$\text{real\_component} = \text{normalized\_value} = 55. \quad (4)$$

The process of determining a value of the real_component of the complex number may be repeated for each pixel of the pre-processed image.

In an embodiment, an imaginary component of a complex number for a pixel may be computed using a variety of ways. For example, an imaginary component may be computed by determining a hue value and a chromaticity value for the pixel and computing a sum of the two values.

If an image is an RGBA image, then a hue value may be computed using the following formula:

$$h_{rgb} = a\tan 2(\sqrt{3}\cdot(G-B), 2\cdot R - G - B) \quad (5)$$

In the above formula, $h_{rgb}$ represents a hue value computed from RGB values, R, G, B represent the R value, G value, and B value, respectively, associated with the pixel, and "a tan 2" represents an arc tan function of "2."

If for a particular pixel one of the R, G, and B components has the strongest intensity, then a hue value is near one of the primary colors, such as red, green or blue. If for a particular pixel two of the R,G, and B components have the strongest intensity, then a hue value for the pixel is near one of the secondary colors, such as cyan, magenta or yellow. A secondary color is formed by a sum of two primary colors of equal intensity. For example, cyan may be obtained by summing green and blue; magenta may be obtained by summing red and blue; and yellow may be obtained by summing red and green. The formula for determining a hue value based on the R, G, and B components provides a method for determining a relationship between the color of the pixel and any of the primary colors.

If an image is represented as a Lab image, defined according to the CIELAB convention, then a hue value for a pixel may be computed using the following formula:

$$h_{ab} = a\tan 2(b^*, a^*). \quad (6)$$

In the above formula, $h_{ab}$ represents a hue value computed from a, b values "a" and "b" correspond to "a" value and "b" value, respectively, associated with the pixel, and "a tan 2" represents an arc tan function of "2."

Other formulas may be used to determine a hue value for a pixel. For example, a hue value may be computed using "u" and "v" values when the color information of the image is represented in a Luv color space, which complies with a CIELUV convention.

In an embodiment, a chroma value may be computed using the following formulas:

$$M = \max(R,G,B) \quad (7)$$

$$m = \min(R,G,B) \quad (8)$$

$$\text{chroma\_value} = M - m. \quad (9)$$

In the above formula, R, G, and B represent the R value, G value, and B value, respectively, that are associated with the pixel.

Other formulas may be used to determine a chroma_value for a pixel. For example, a chroma_value may be computed using "a" and "b" values when the color information of the image is represented in a Lab space, which complies with the CIELAB convention. A chroma value may also be computed using "u" and "v" values when the color information of the image is represented in a Luv color space, which complies with the CIELUV convention.

Once a hue value and a chroma_value are determined for a pixel, an imaginary component of the complex number for the pixel may be computed by adding the hue value and the chroma_value. The following formula may be used for example, to determine a value of the imaginary component of the complex number for the pixel:

$$\text{imaginary\_component} = \text{hue\_value} + \text{chroma\_value}. \quad (10)$$

The process of determining a value of the imaginary_component of the complex number is repeated for each pixel of the pre-processed image.

Once a real_component and an imaginary_component for each pixel of an image, the complex numbers for the pixels are determined. A complex number may be represented as a pair $\{\text{real\_component}, \text{imaginary\_component}\}$. For example, a complex number for a particular pixel may be represented as:

$$\text{complex\_number} = \{\text{real\_component}, \text{imaginary\_component}\} \quad (11)$$

The process of determining the complex number for a pixel is repeated for each pixel of the pre-processed image.

3. Determining Low Frequency Components Using Fourier Transform

In step 308, low frequency components are determined for an image using the FFT. The FFT transforms one representation of data to another representation of the same data. For example, the FFT allows transforming a time-based representation of complex numbers determined for the pixels of the image into a frequency-based representation of the same complex numbers.

In an embodiment, values of the complex numbers determined for the pixels of an image are plugged into the FFT to determine a plurality of frequency components for the image. This step may be implemented using a variety of approaches.

FIG. 4 illustrates an example programming code for using the FFT to determine a plurality of frequency coefficients. The example programming code is written in C#; however, the code implementing the approach may be written in any other programming language.

The example programming code comprises a section 410 for determining a real component of the complex number for an image, a section 420 for determining an imaginary component of the complex number for the image, and a section 430 for determining output of the FFT based on the real components and imaginary components. In particular, section 410 comprises the following instructions:
byte value=color.value( );
//float fValue=color.value( )/255.0f;
float fValue=color.valueWithAlpha( )/255.0f;
When executed, the above instructions cause computing real_components of the complex numbers for the pixels. The process of computing the real_components was described above.

Section 420 comprises the following instructions:
byte min=color.minimum( );
int chroma=value−min;
float fChroma=chroma;
if (chroma>64)
{
int den=(int)color.g−color.b;
int numer=(int)color.r−color.g−color.b;
double hue=Math.A tan 2(2*numer, Math.Sqrt(3)*den)+Math.PI;
hue=Byte.MaxValue*ImageUtil.wrap(hue*2.0/Math.PI);
fChroma+=(float)hue;
fChroma=fChroma−(float)Math.Floor(fChroma);
}
When executed, the above instructions cause computing imaginary_components of the complex numbers for the pixels. The process of computing the imaginary_components was described above.

Section 430 comprises the following instructions:
return new ComplexF(fValue, fChroma);
When executed, the above instructions cause determining output of the FFT when complex numbers, represented using real components and imaginary components, are provided.

Function ComplexF is an encoded FFT function defined over complex numbers determined for pixels of an image. Each complex number is represented by a real component and an imaginary component. The process of determining a real component and an imaginary component for a pixel of an image was described above.

Figure 5:
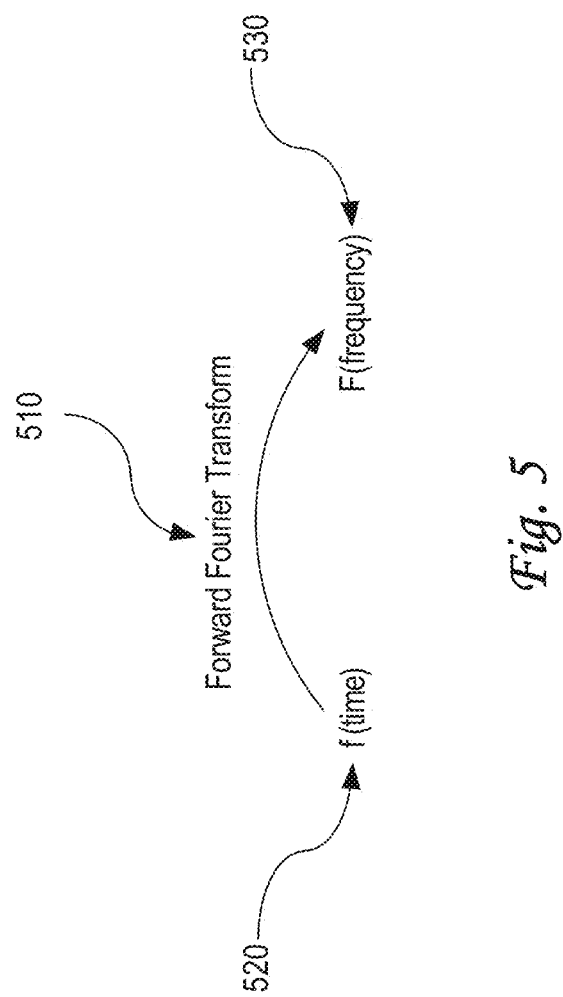
FIG. 5 illustrates an example application of the Forward Fourier Transform to a key-extraction approach.

FIG. 5 illustrates an example application of the FFT 510 to a key-extraction approach. The FFT 510 transforms one representation of data to another representation of the same data. In particular, the FFT 510 allows changing a representation of the same data by transforming a time-based function 520 into a frequency-based function 530, both functions representing the same data.

FFT 510 may be represented using various notations and mathematical equations. In an embodiment, FFT 510 is represented using the following equation:

$$F(v) = \int_{-\infty}^{\infty} f(t) * e^{-2\pi i v t} dt \quad (12)$$

where f(t) is a function that represents the data in a time domain, and F(v) is a function that represents the same data in a frequency domain.

Figure 6:
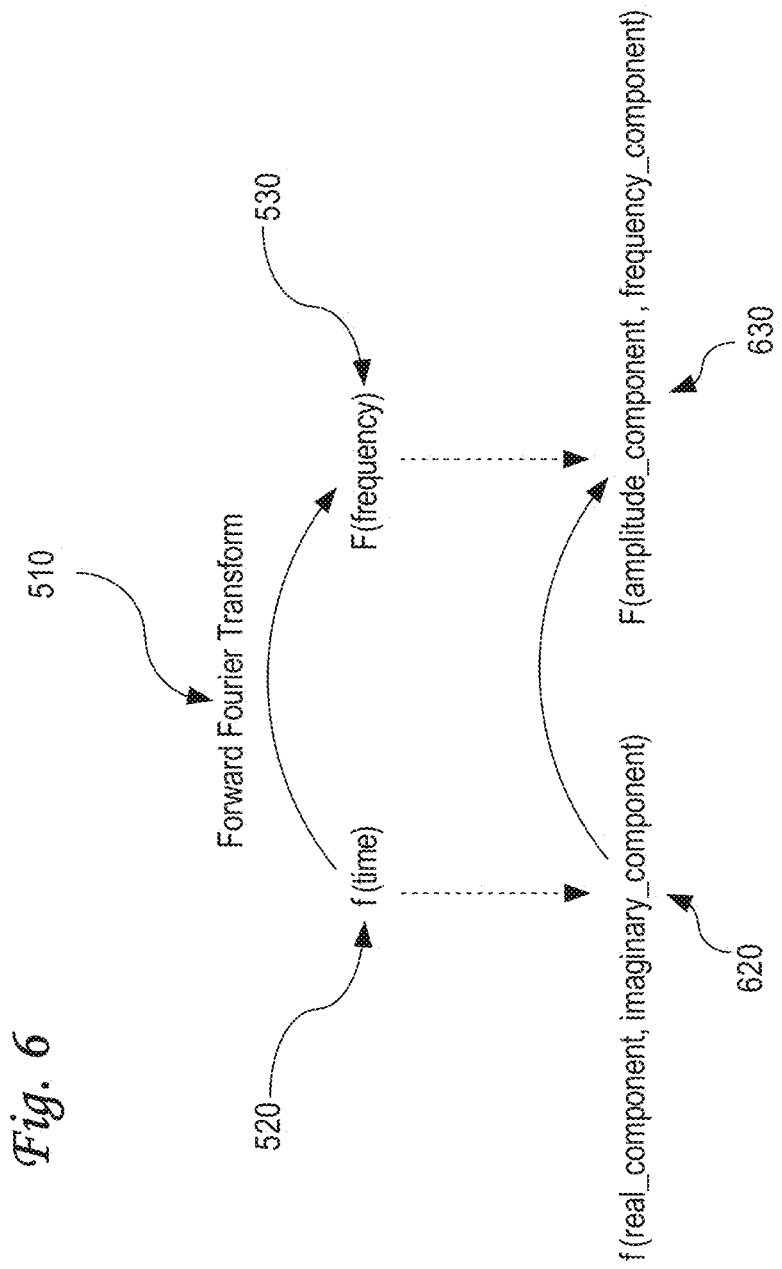
FIG. 6 illustrates an example application of the Forward Fourier Transform to a key-extraction approach.

FIG. 6 illustrates an example application of FFT 510 to a key-extraction approach. In this example, FFT 510 transforms data represented in a time domain to the same data represented in a frequency domain. In particular, FFT 510 transforms the data represented in a time domain by a function f(t) 520 to the data represented in the frequency domain using a function F(v) 530.

A domain of a function may be represented using complex numbers. For example, parameters of function f(t) 520 may be represented as complex numbers, each of which comprises a real component and an imaginary component. For example, as depicted in FIG. 6, function f(t) 520 may be represented as a f(real_component, imaginary_component) 620, wherein the real_component and the imaginary_component are components of a complex number. Similarly, function F(v) 530 may be represented as a F(amplitude_component, frequency_component) 630, wherein the amplitude_component and the frequency_component are components of a complex number.

Figure 7:
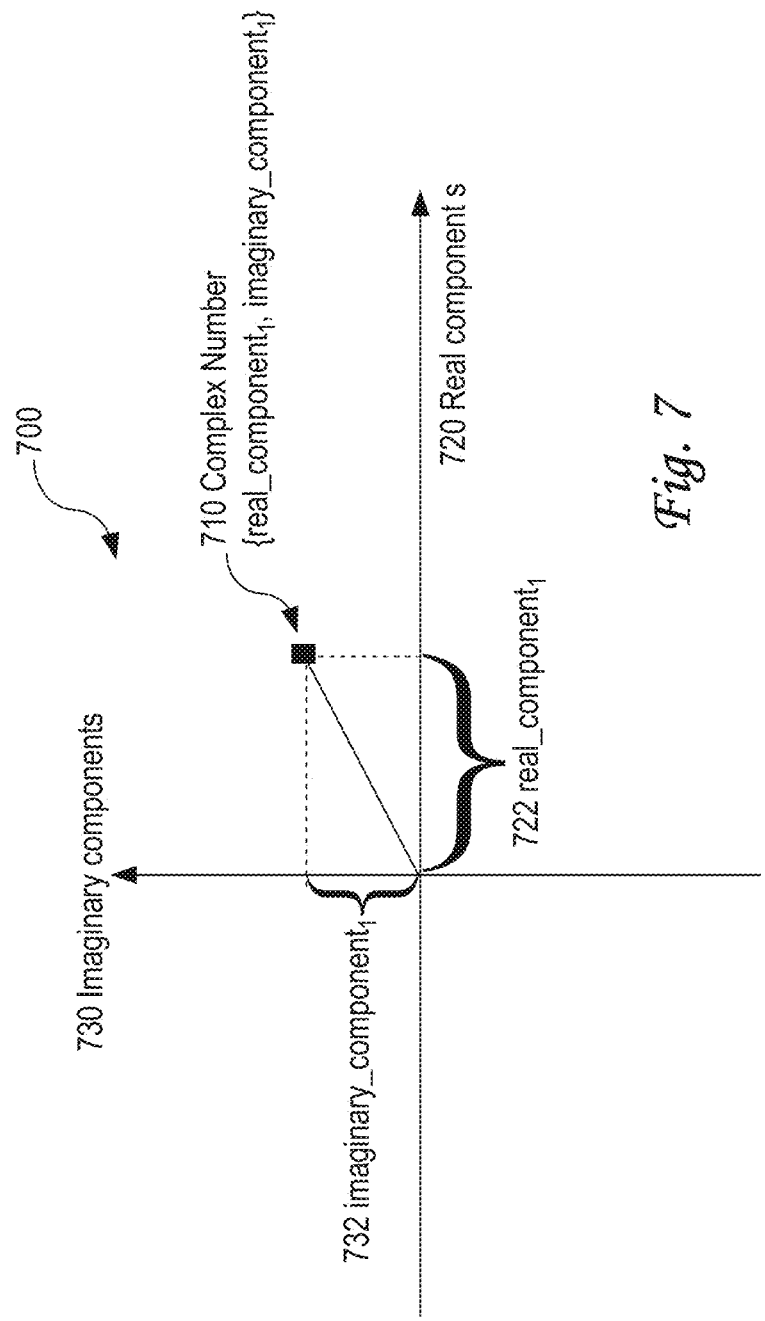
FIG. 7 illustrates an example of a graphical representation of a complex number.

FIG. 7 illustrates an example of a graphical representation of a complex number. In an embodiment, complex numbers may be represented using a mapping, such as a Cartesian two-dimensional plot 700. Plot 700 has a horizontal axis 720 and a vertical axis 730. Horizontal axis 720 represents real components of the complex numbers determined for the pixels of an image. Vertical axis 730 represents imaginary components of the complex numbers determined for pixels of the image. For example, a particular complex number 710, represented as a {real_component$_1$, imaginary_component$_1$}, may be graphically represented as having the value 722 along horizontal axis 720 and the value 732 along vertical axis 730.

Values of the real-components and the imaginary components for each pixel of the image are used by the FFT to generate F(v) 530 representing data in the space defined by the pairs containing {amplitude_component, frequency_component} for each pixel of an image.

Output of the FFT may be stored in a data structure. Examples of the data structures may include data arrays and data tables. For example, the output of the FFT, consisting of the pairs {amplitude_component, frequency_component} may be stored in a two-dimensional data table having rows, corresponding to the rows in an input image, and columns, corresponding to the columns of in the input image. The pairs {amplitude_component, frequency_component} may also be organized using other approaches and other data structures. For example, the amplitude components may be stored in one data array, and the frequency components may be stored in another data array.

In an embodiment, pairs containing {amplitude_component, frequency_component} are analyzed to select the pairs comprising low frequency components. Distinguishing between the low frequency components and other frequency components may be performed by establishing a threshold requirement, and then identifying the frequencies from the frequency components that meet the threshold requirement. A threshold requirement may be based on a threshold frequency value and the threshold frequency value may be used to compare the frequencies from the frequency components with the threshold frequency value.

Using the threshold frequency value allows dividing frequency values determined for an image into a group of frequency values that are significant for obtaining keys for an image and to a group of frequency values that are insignificant. The insignificant frequency values may represent the information that most likely insignificantly contributes to the contents of the keys, and thus such frequencies may be ignored.

A threshold frequency value may be determined based on empirical data and may indicate that the frequency values that do not exceed the threshold frequency value are considered low frequencies for the purpose of extracting keys from images, and the frequency values that exceed the threshold are considered to be insignificant for the purpose of extracting the keys. The insignificant frequencies may indicate insignificant details depicted in the image, or artifacts present in the image data. Such frequencies very often indicate so called "noise" data in the image. Therefore, for the purpose of extracting the keys from images, such frequencies may be ignored.

In an embodiment, keys are extracted based information included in those pairs obtained using the FFT that contain low frequency values.

Figure 8:
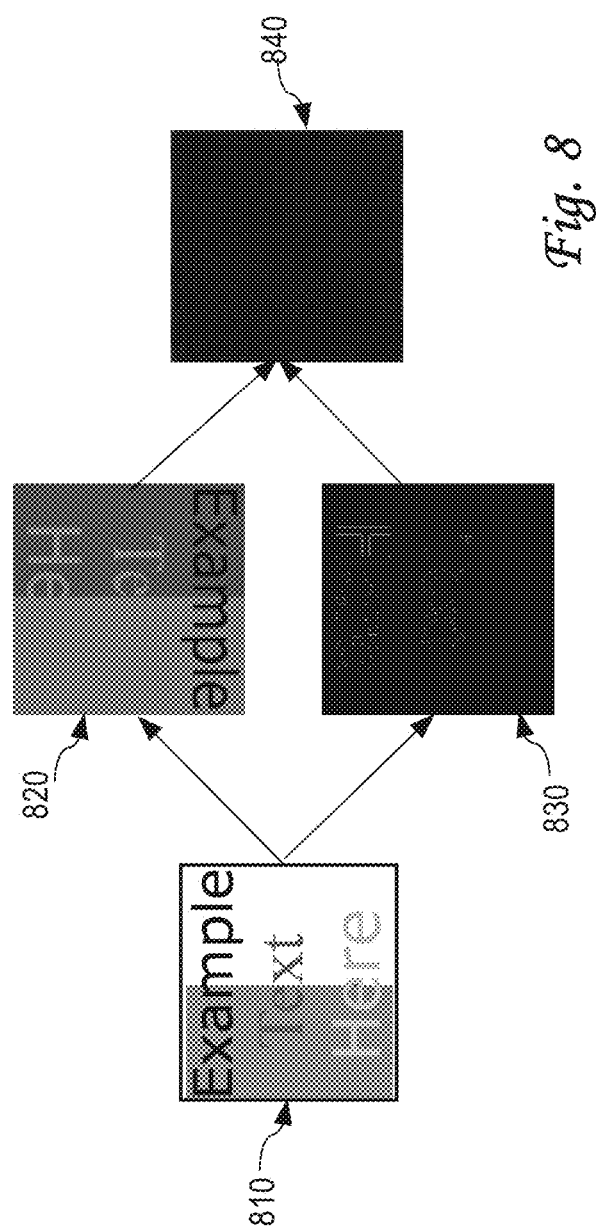
FIG. 8 illustrates example images generated using a pixel-value-based key-extraction approach.

FIG. 8 illustrates example images generated using a pixel-value-based key-extraction approach. The example images comprise an example input image 810, an example real_component image 820, an example imaginary_component image 830, and an example output image 840. The input image 810 may be any digital image containing data represented in any image format, such as PDF, PNG, JPEG, TIFF. Example input image 810 is an example of the image for which one or more key are to be extracted. In the depicted example, input image 810 contains a gray-white background, and a text appearing in a foreground. The text contains three words, and reads "Example Text Here".

In an embodiment, example input image 810 is a two-dimensional array of pixels. Each pixel may have associated color information. The color information may be represented using various color-representation schemes, including the RGBA scheme, the Luv scheme, the Lab scheme, or any other color-representation scheme.

Example input image 810 may be pre-processed using the approach described in step 304 of FIG. 3, and then using the approach described in step 306 of FIG. 3.

Example real_component image 820 and example imaginary_component image 830 are examples of images that may be obtained upon completing step 306 of FIG. 3. In that step, a complex number is generated for each pixel of the input image, such as example image 810, or a pre-processed image obtained from example image 810. In particular, example real_component image 820 may contain real component values of the complex numbers determined for the pixels of example image 810, and example imaginary_component image 830 may contain imaginary component values of the complex numbers determined for the pixels of example image 810.

In an embodiment, example output image 840 contains amplitude values associated with low frequency components generated by the as described in step 308 of FIG. 3. For example, example output image 840 may contain values of the amplitudes extracted from the pairs that contained the frequency values that do not exceed a particular threshold frequency value. The pairs may be determined using the FFT by transforming the values of the real components stored in real_component image 820 and the values of the imaginary components stored in imaginary_component image 830.

In the example depicted in FIG. 8, example output image 840 appears as a black rectangle and contains pixels that represent amplitudes for the low frequency components. One of the reasons that the example output image 840 appears to be black is that each pixel of the image represents an amplitude value that is small number, and a color information represented by for example, small R, G, B, values seems to gravitate toward a black color.

4. Determining Hash Keys Based on Low Frequency Components

Referring again to FIG. 3, in step 310, one or more keys are generated for an image. A key may be generated using the output of the FFT, containing pairs, each of which contains {amplitude_component, frequency_component}. Alternatively, a key may be generated using values of the amplitude components that are associated with the low frequency components.

In an embodiment, keys are generated using data containing values of amplitude components associated in the pairs generated using the FFT with the low frequency components.

In an embodiment, each key may be generated based on a subset of rows and columns of a two-dimensional array. If two or more keys are generated, then to achieve the uniqueness of the keys, the selected subsets of the rows and columns for generating the keys are unique. For example, one key may be generated by extracting the data stored in the first fifteen rows and the first fifteen columns of the array, and processing the extracted data. Another key may be generated by extracting the data stored in the first twelve rows and the first twenty columns of the array, and processing the extracted data. Other key may be generated by extracting the data stored in the rows 20-30 and the columns 20-30. The subset of the rows and keys may be determined using other approaches and methods.

Once a subset of rows and columns of the two-dimensional array of amplitude values is selected, the values may be serialized. The serialized values may be normalized and further processed. Normalized values are referred to as a sequence of normalized values.

A further processing of the sequence of normalized values may include determining a mean value of the normalized values. Additionally, a minimum value and a maximum value for the normalized amplitude values may be determined.

There are many approaches for generating a hash value for a sequence of normalized values. For example, a hash value may be generated using a threshold value to convert each value in the sequence to either "1" or "0" and representing the resulting sequence in a binary formal, a hexadecimal format, or the like. In this approach, each value in the sequence may be compared with a mean value determined based on the values in the sequence, and if the value exceeds ¾ of the mean value, then the value is replaced in the sequence with "1." Otherwise, the value is replaced in the sequence with "0." The resulting sequence of zeros and ones may be interpreted as a binary hash value, and the binary hash value is used as a hash key extracted from the input image.

In an embodiment, a resulting sequence of zeros and ones is converted to a hexadecimal value, and the hexadecimal hash value is used as a hash key extracted from the input image.

An example of program code for hashing the keys is:

```
using System;
using System.Collections.Generic;
using System.Drawing;
using System.Linq;
using System.Text;
using MatchMaker.Util.Fourier;
namespace MatchMaker.Images.PixelKeys
{
///<summary>
///A modified, modular version of a "pHash" perceptual hash.
///</summary>
public class PHash
{
private readonly Size targetSize;
private readonly Size hashRegionSize;
private readonly int salt;
```

```
private readonly long primeCoefficient;
private readonly IImageToComplexImage converter;
public PHash(Size targetSize, Size hashRegionSize, int salt,
long primeCoefficient, IImageToComplexImage converter)
{
this.targetSize=targetSize;
this.hashRegionSize=hashRegionSize;
this.salt=salt;
this.primeCoefficient=primeCoefficient;
this.converter=converter;
}
public long computeHash(Bitmap input)
{
return   computeHash(ImageUtil.resizeToExactSize(input,
targetSize));
}
public   long    computeHashFromResizedImage(Bitmap
resized)
{
return computeHashFromResizedImage(new SimpleColor-
Matrix(resized));
}
public long computeHashFromResizedImage (SimpleColor-
Matrix scm)
{
var complexImage=converter.convert(scm);
complexImage.FFT( );
return computeHashFromFFT(complexImage);
}
public  long  computeHashFromFFT(ComplexImage com-
plexImage)
{
unchecked
{
//offset away from DC, DC-horizontal, and DC-vertical com-
ponents
int cols=Math.Min(hashRegionSize.Height, complexImage-
.Cols−1);
int rows=Math.Min(hashRegionSize.Width, complexImag-
e.Rows−1);
if (cols<1∥rows<1)
return −6620830889L;
//int[ ] values=new int[rows*cols];
long valueAcc=0;
long length=rows*cols;
//int dc=0;
var sampleRegion=new IntMatrix(rows, cols);
double scale=(double)(100000.0/Math.Sqrt(rows*cols));
for (int c=cols−1; c>=0; c−−)
{
for (int r=rows−1; r>=0; r−−)
{
ComplexF complexValue=complexImage.get(r, c);
float magnitude=complexValue.GetMagnitude( );
int integerValue=(int)Math.Floor(magnitude*scale);
if (c==0 && r==0)
{
//dc=integerValue;
continue;
}
valueAcc+=integerValue;
sampleRegion.set(r, c, integerValue);
}
}
//int threshold=(int)(valueAcc/length);
int threshold=(int)(0.75*(valueAcc/length));
//int threshold=dc;
```

```
int salt=this.salt;
long hashAcc=0;
int mask=64−1;
for (int i=sampleRegion.Length−1; i>=0; i−−)
{
int sectionIndex=i & mask;
//LCG seeded with this.salt determines mapping offset
if (sectionIndex==0)
salt=salt*2147483629+2147483587;
int offset=(i+salt) & mask;
int value=sampleRegion.get(i);
if (value>threshold)
hashAcc ^=(1<<offset);
//hashAcc*=primeCoefficient;
//int value=sampleRegion.get(i);
//if (value>threshold)
//hashAcc ^=salt;
}
return hashAcc;
}
}
}
}
```

Referring again to FIG. 3, in step 312, the process determines whether all hash keys have been extracted from an input image. For example, in some implementations, it is sufficient to extract one key from an image. In other implementations, two or more keys are to be extracted from each image. In yet other implementations, at least a predetermined count of keys are to be extracted from each image, or from each image of the particular type.

If it is determined that an additional key or keys are to be extracted from an input image, then the process proceeds to step 314. Otherwise, the process proceeds to step 316.

In step 314, a new subset of frequency components is selected for the purpose of generating another key for an input image. For example, if a first key has been extracted from the image by extracting the data stored in the first fifteen rows and the first fifteen columns of the array of amplitudes corresponding to first fifteen rows and the first fifteen columns of the array of the low frequency components, then for the purpose of generating a second key, a new subset of frequency components may be selected as the first twelve rows and the first twenty columns of the array of the amplitude components.

Once the new subset of frequency components is selected, and the corresponding values of the amplitude components are identified, the process proceeds to step 310, described above.

5. Determining Metadata

In step 316, metadata is generated for each key generated for an image. Metadata for a particular key and a particular image may represent an association between the particular key and the particular image. For example, the first metadata may represent an association between the first key and the particular image, while the second metadata may represent an association between the second key and the particular image, and so forth.

6. Storing Metadata in Association with Image

In step 318, metadata is stored in association with an image. For example, the metadata representing associations between a particular image and one or more keys extracted for the particular image may be stored in a space indexed using the pointers referenced from the storage space dedicated for storing the particular image.

7. Updating Index Information

In step 320, information stored in one or more indexes is updated using information included in the metadata. For example, the information included in the metadata may be used to update an inverse index maintained for a collection of images. An inverse index may be used to identify one or more images for which the same key was extracted. As described above, one of the properties of the process of extracting keys from images is that a key extracted from an image is invariant under transformations of the image, such as an image resizing, rotating, scaling or brightening, that only insignificantly alter the visual content of the image. Hence, if a first image represents a red square in which each edge has a length of one inch, and a second image represents a red square in which each edge has a length of two inches, then the images are similar to each other since one is a scaled version of another. Therefore, using the described approach for extracting keys from images, most likely at least one key extracted from the first image will match one key extracted from the second image. Hence, an inverse index maintained for the first and second images may include at least one key and two associations: one representing an association between the key and the first image, another representing an association between the key and the second image.

An inverse index may be very useful in organizing a library of images. For example, the inverse index may be used as a lookup tool for distinguishing between the images that are similar to each other and the images that are different from each other. Based on the unique property of the approach for extracting keys from images, the images from which the same keys have been extracted may be identified as similar images, and the images from which different keys have been extracted may be identified as different.

Inverse indexes generated from keys extracted from images using the presented approach may have broad applications in image processing. For example, inverse indexes may be used in designing logos, emblems and other graphical depictions. In particular, the indexes may be used to determine whether a newly designed logo is in any way similar to the logo that has been already designed for another client or customer. Furthermore, the inverse indexes may be used to determine whether a particular graphical design created by one enterprise infringes in any way on designs already designed or registered by another enterprise. That may be particularly useful in copyrights and trademark infringement proceedings.

V. Extracting Hash Keys from Filtered Images

In an embodiment, hash keys are extracted from images that are filtered. Usually, filtering of an image takes place after an input image is pre-preprocessed. While pre-processing of an image is directed to performing an image rotation, resizing, scaling, and the like, filtering of an image is directed to identifying and optionally accentuating edges of the objects depicted in the image.

1. Image Pre-Processing

Figure 9:
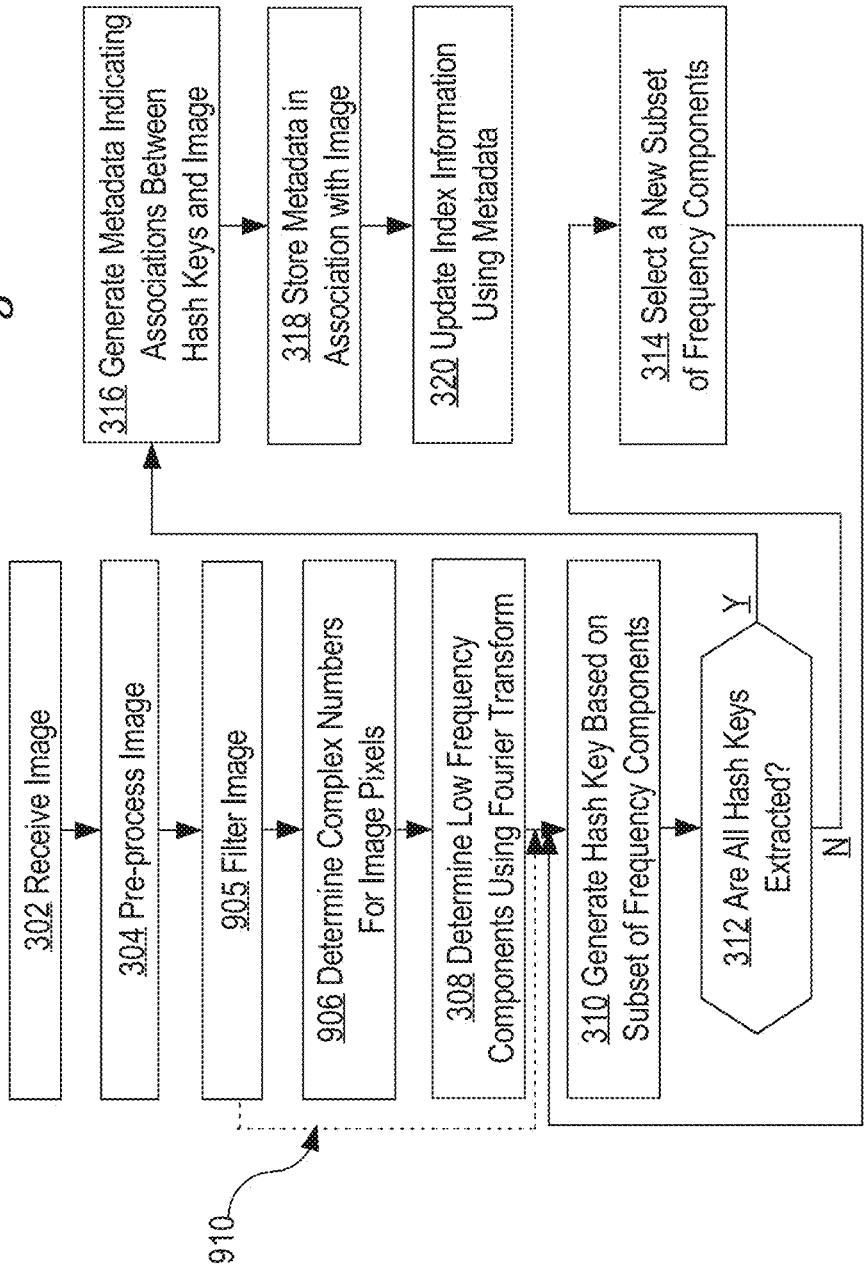
FIG. 9 illustrates a method for extracting keys from a filtered digital image.

FIG. 9 illustrates a method for extracting keys from a filtered digital image. In step 302, an input image is received. This step is similar to step 302 described in FIG. 3. The process of receiving an input image and the various types of the input images are the same as those described in step 302 of FIG. 3.

In step 304, an input image is pre-processed. This step is similar to step 304 described n FIG. 3. Pre-processing of an image is different from an image filtering, which is described below. The pre-processing is directed to performing resizing, scaling, rotating and the like, while the filtering is usually performed on the image that was already pre-processed and thus, is performed on the image that has been already resized, scaled or rotated.

2. Image Filtering

In step 905, a pre-processed image is filtered. Filtering an image may include the processing that causes accentuating the lines in the image and causes ignoring color information and gradual changes in gradients for the image. Such processing may allow deriving a filtered image that captures the features of the input image that are color-independent and frequency-value independent. For example, if an input image represents a red rectangle, then a filtered image, obtained from the input image, may not capture the color information of the image; however, it may capture the shape and line information of the input image.

Additionally or alternatively, an image may be filtered by performing an image sharpening or image-contour sharpening. Generally, sharpness described the clarity of detail in an image. Examples of factors that contribute to the perceived sharpness of an image include an image resolution and image acutance. Image resolution describes the ability to distinguish between closely spaced elements of a detail depicted in the image. Image acutance describes how quickly image information transitions at edges depicted in the image. Hence, the high acutance results in sharp transition and detail with clearly defined edges.

In an embodiment, an image filtering may be performed using an image sharpening process. One of the objectives of the image sharpening is to emphasize the image clarity and focus of the image. The objective may be achieved by applying a bitmap mask to the RGB pixel values of the input image to process the input image to create the appearance of more pronounced edges included in the image.

In an embodiment, an image filtering is performed using a saliency approach. A saliency approach is a method for detecting edges in an image. A saliency approach may include applying a filter to an input image to detect the edges of the input image and generating output comprising the detected edges. The output image is referred to as a saliency image. A saliency image is determined by generating a saliency value for edges identified based on pixel values of the image.

Generating a saliency image may involve determining values for so called salient points of the input image. Salient points may be defined as intensity corners in the image. For example, if an image represents a rectangle, then the salient points may be defined as the corners of the rectangle. One of the advantages of defining the salient points as the image corners is that a special relationship between such points does not change even if the original image is rotated, resized or translated.

In an embodiment, determining salient points as intensity corners may comprise determining salient points by computing and analyzing gradient values for neighboring pixels in an image.

Once salient points are determined for an image, the salient points may be used to generate a saliency image. A saliency image is a graphical representation of the distribution of the salient points in an original image.

3. Generating Hash Keys for a Filtered Image and Post-Processing

Figure 10:
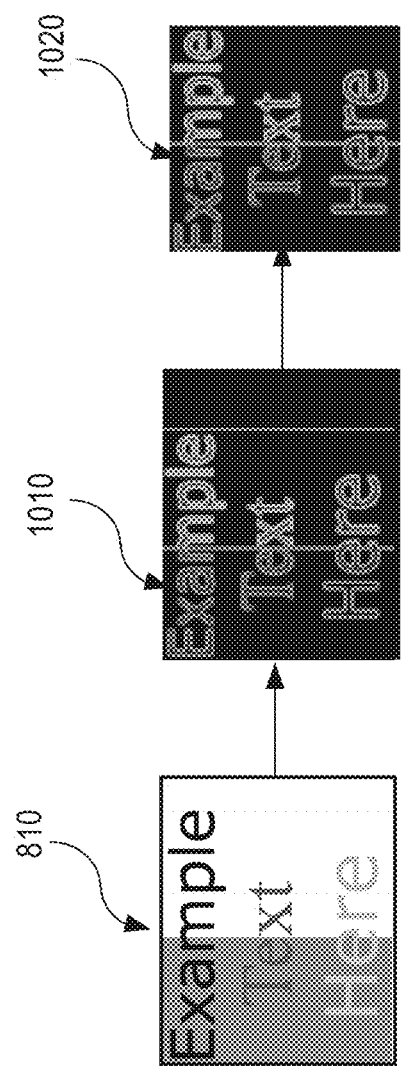
FIG. 10 illustrates example images generated using a filtered-image key-extraction approach.

FIG. 10 illustrates example images generated using a filtered-image key-extraction approach. The example images comprise an example input image 810, a saliency image 1010 and a cropped saliency image 1020. Example input image 810 has a white-gray background and a words "Example Text Here" in the foreground. Example input image 810 was described in FIG. 8. Example saliency image 1010 is generated using the approach described above, and contains a black background and contours of the words "Example Text Here." Example cropped saliency image 1020 is a cropped image obtained from example saliency image 1010. For example, cropped saliency image 1020 is obtained by cropping portions of the top, bottom, left and right sides of the image containing no salient features.

In an embodiment, hash keys are computed directly from a cropped saliency image 1020. In this approach, the hash keys are computed directly from the cropped saliency image rather than from output generated by the FFT. For example, referring again to FIG. 9, once a filtered image for an input image is obtained and cropped, a process may proceed to step 310, as indicated by an arrow 910. Then, in step 310, as described in detail in FIG. 3, one or more hash keys are generated for the input image.

Example program code for implementing computations of hash keys directly from the cropped saliency image is provided below:

```
using System;
using System.Collections.Generic;
using System.Drawing;
using System.Linq;
using System.Text;
using MatchMaker.Util.Fourier;
namespace MatchMaker.Images.PixelKeys
{
///<summary>
///A modified, modular version of a "pHash" perceptual hash.
///</summary>
public class PHashSaliency
{
private readonly Position targetSize;
private readonly int salt;
private readonly long primeCoefficient;
//private readonly byte threshold;
public PHashSaliency(Position targetSize, int salt,
long primeCoefficient)//, byte threshold)
{
this.targetSize=targetSize;
this.salt=salt;
this.primeCoefficient=primeCoefficient;
//this.threshold=threshold;
}
public   long   computeHashFromSaliency(ByteMatrix saliency)
{
float colConversion=(float)targetSize.col/saliency.Cols;
float rowConversion=(float)targetSize.row/saliency.Rows;
FloatMatrix summary=new FloatMatrix(targetSize);
for (int c=saliency.Cols-1; c>=0; c--)
{
int lowerCol, upperCol;
float upperPortionCol, lowerPortionCol;
downsampleMapping(out lowerCol, out upperCol,
out upperPortionCol, out lowerPortionCol,
saliency.Cols, colConversion, c);
for (int r=saliency.Rows-1; r>=0; r--)
{
int lowerRow, upperRow;
float upperPortionRow, lowerPortionRow;
downsampleMapping(out lowerRow, out upperRow,
out upperPortionRow, out lowerPortionRow,
saliency.Rows, rowConversion, r);
float s=saliency.get(r, c);
acumulate(summary,       lowerRow,       lowerCol,
lowerPortionRow*lowerPortionCol*s);
acumulate(summary,       lowerRow,       upperCol,
lowerPortionRow*upperPortionCol*s);
acumulate(summary,       upperRow,       lowerCol,
upperPortionRow*lowerPortionCol*s);
acumulate(summary,       upperRow,       upperCol,
upperPortionRow*upperPortionCol*s);
}
}
return computeHashFromResized(summary);
}
private static void acumulate(FloatMatrix summary, int row,
int col, float v)
{
if (summary.isMasked(new Position(row, col)))
{
summary.set(row, col,
summary.get(row, col)+v);
}
}
private static void downsampleMapping(
out int lower, out int upper, out float upperPortion, out float lowerPortion,
int limit, float conversionFactor, int index)
{
float dest=conversionFactor*index;
lower=(int)Math.Floor(dest);
upper=lower+1;
if (upper>=limit)
upper=lower;
upperPortion=dest-lower;
lowerPortion=1.0f-upperPortion;
}
public  long  computeHashFromResized(FloatMatrix summary)
{
unchecked
{
int cols=summary.Cols;
int rows=summary.Rows;
double valueAcc=0;
int length=summary.Length;
for (int i=length-1;i>=0;i--)
{
float s=summary.get(i);
valueAcc+=s;
}
float threshold=(float)(0.5*(valueAcc/length));
int salt=this.salt;
long hashAcc=0;
int mask=64-1;
for (int i=length-1; i>=0; i--)
{
int sectionIndex=i & mask;
//LCG seeded with this.salt determines mapping offset
if (sectionIndex==0)
salt=salt*2147483629+2147483587;
int offset=(i+salt) & mask;
float value=summary.get(i);
if (value>threshold)
hashAcc ʌ=(1<<offset);
}
return hashAcc;
}
}
}
}
```

In an alternative embodiment, a cropped saliency image is used to generate complex numbers for the image, and then the FFT is applied to the complex numbers to generate keys.

In step 906, complex numbers are determined for a filtered image, or a cropped filtered image. A complex number, having a real_component and an imaginary_component, for a pixel of the cropped saliency image may be determined using a variety of approaches. For example, a complex number for a pixel may be determined by computing a real_component of the complex number based on the color values associated with the pixel, and setting an imaginary_component of the complex number to "0." Computing the real_component of the complex number may include adding the R, G, B color values and dividing the sum by "3," normalizing the sum using any applicable approach.

Once complex numbers for the pixels of a (cropped) saliency image are determined, a process proceeds to step 308.

In step 308, low frequency components are determined using the FFT. This step was described in detail in FIG. 3. Generally, in step 308, the FFT is applied to complex numbers determined for the provided image, and output, containing pairs of {amplitude_component, frequency_component}, is generated. Then, the output is processed by deleting those pairs that contain a frequency_component value exceeding a certain threshold frequency value. The remaining pairs are the pairs that contain frequency component values lower than the certain threshold frequency value, and hence, referred to as low frequency component pairs.

In step 310, a hash key is computed based on the subset of the low frequency components. This step and the remaining steps 312-320 were described in detail in FIG. 3.

VI. Extracting Hash Keys from Image Contours

Figure 11:
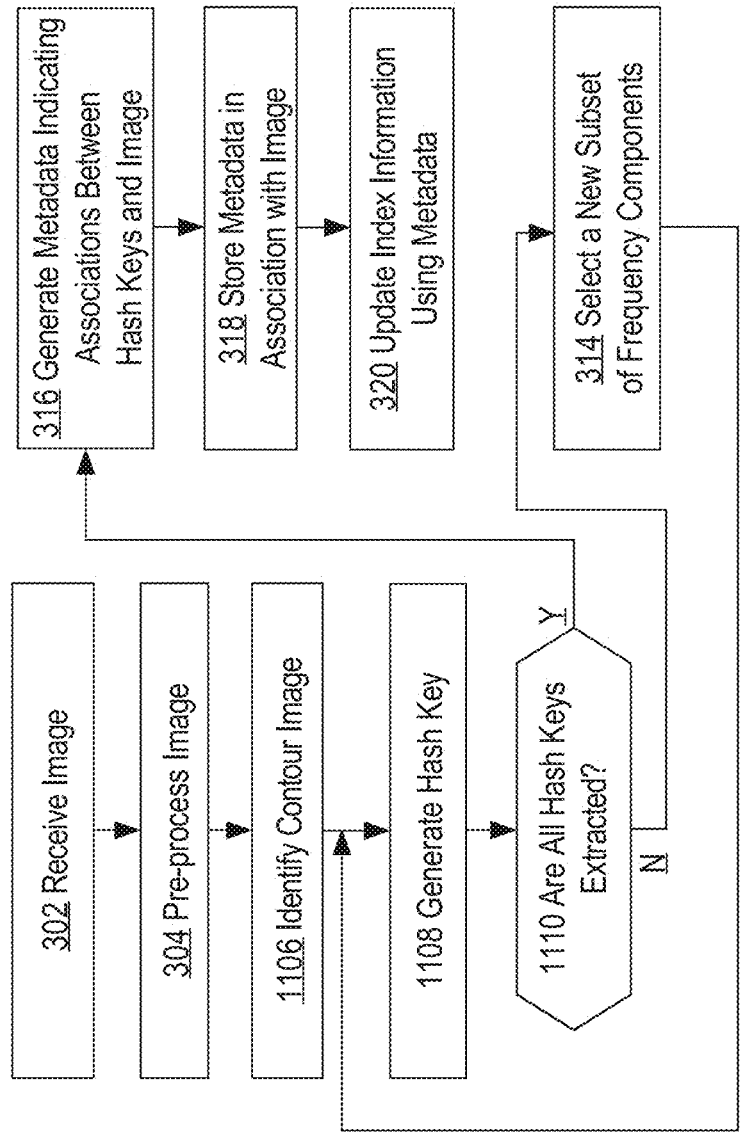
FIG. 11 illustrates a method for extracting keys from contours of an image.

FIG. 11 illustrates a method for extracting keys from contours of an image. In step 302, an input image is received. This step is similar to step 302 described in FIG. 3. The process of receiving an input image and the various types of the input images are the same as those described in step 302 of FIG. 3.

In step 304, an input image is pre-processed. This step is similar to step 304 described n FIG. 3.

1. Capturing Image Contour Information

In step 1106, a contour image is determined for a pre-processed image. Contours of the pre-processed image may be identified using various approaches.

In an embodiment, contours of a pre-processed image are identified using an iterative process, in which each iterative step allows identifying the contours with a higher probability that it was determined in the preceding step.

An iterative process may start with assigning a default belief value that a pixel belongs to a particular segment that constitute a contour. For example, in the first iterative step, for every post-processed image pixel, a belief is maintained that there is a segment to which the pixel belongs. The belief may be represented by a number or value, and the values associated with the respective pixels may be stored in an array of belief values.

In the next iterative step, the image is scanned according to multiple different patterns, and the belief values for the pixels are refined. The refining may be performed by propagating the belief values. This may be achieved by comparing distribution of pixels in segments and considering whether the pixels appear to be a part of the same or different segment, or whether the pixels are not part of any segment.

The iterative steps are repeated until refining of the belief values does not provide any significant improvement in the belief values. Once refining the belief values appears to be unnecessary, it is assumed that that an association between pixels and respective segments is established. The identified segments are referred to as edges. Then, outlines of the segments are detected, and based on the outlines, boundaries of the regions within the image are determined. The boundaries within the images are used to determine a set of contours of the image.

Figure 12:
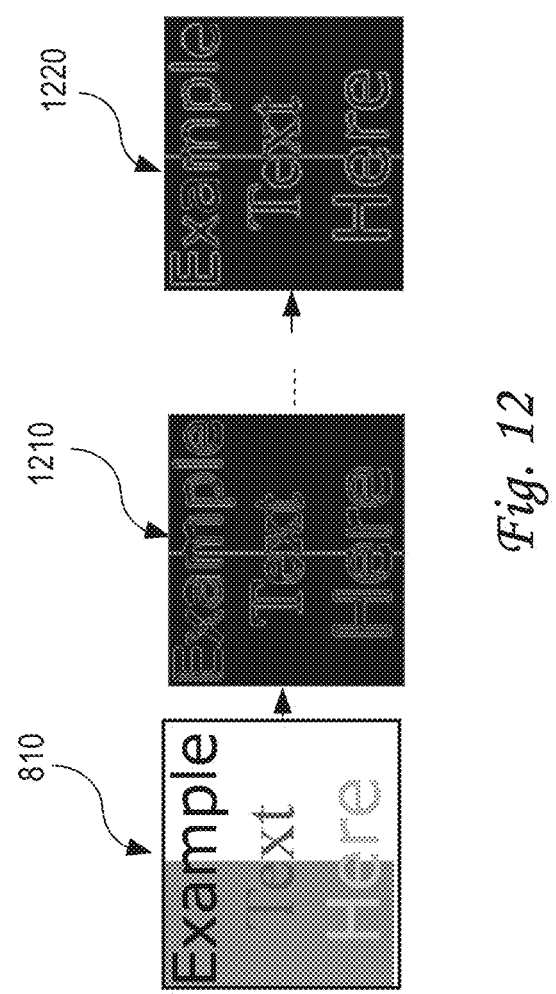
FIG. 12 illustrates example output generated by an iterative process of identifying contours in an image.

FIG. 12 illustrates example output generated by an iterative process of identifying contours in an image. The depicted outputs are examples of the images that were produced from an input image 810. Input image 810 was described in detail in FIG. 8. By repeating the iterative process of identifying contours in input image 810, a sequence of contour images 1210-1220 may be generated. As depicted in FIG. 12, contour image 1210 depicts some contours generated from input image 810, while contour image 1220, obtained in one of the subsequent iterations, depicts the contours with a higher clarity than the contour image 1210. The sequence of contour images may comprise any number of intermediate images, not just contour images 1210-1220 depicted in FIG. 12.

In an embodiment, the last contour image generated using the iterative process described above, is processed using a de-occlusion method.

In an embodiment, a process of de-occlusion comprises dividing a contour image into sub-images, where each of the sub-images contains one or more contours. Then, the contours that are deeply occluded by other contours (or objects) are identified. The contours that are deeply occluded by other contours or objects are considered bottleneck in the process of extracting keys from the images.

In an embodiment, a de-occlusion process comprises identifying, for each pixel, a segment to which the pixel belongs, and comparing a distribution of pixel color values for each pixel. If the distributions for two pixels are similar (or similar within a certain threshold), then the two pixels are merged into a single segment. A similarity threshold may be defined and used in determining whether the distribution of pixel color values for each pair of the pixels. The similarity between the distributions may be established by determining vectors of color values for the pixels, normalizing the vectors and comparing whether the vectors are similar to each other within a margin of error, which may correspond to a similarity threshold. If two vectors for two pixels are similar to each other, then the corresponding pixels are merged, as belonging to the same segment.

A distribution-based de-occlusion approach is a robust and powerful tool for refining contour images for the purpose of extracting keys from images. The de-occlusion process is applicable to black-and-white images as well as to color images. It provides stability of the iterative process. It is resilient to small changes in an input image, and adapted to process a variety of different types of images.

In an embodiment, the identified contours are resampled into a 64×64 contour image, using a distance measure as a "time domain" and using a linear interpolation.

Once a contour image for an input image is determined, the process proceeds to step 1108.

2. Generating Hash Keys from Image Contour Information

In step 1108, a hash key is generated. In an embodiment, four types of keys are extracted from each contour. For each type, several hash codes are computed, and each hash code is computed using a different seeds and a quantization threshold.

In an embodiment, an "angle-type-key" is generated. This type of key is generated based on the angle-information included a contour image. In generating an angle-type-key, relative angles between the corners in the contour image are determined, and the angle information is used to determine values for the angle-type-key. For example, if a contour represented in a contour image is a square, then since the square has four 90 degrees angles, the information about the 90 degrees angles is used to generate an angle-type-key. According to another example, if a contour represented in a contour image is a triangle, then since the triangle has three 60 degrees angles, the information about the 60 degrees angles is used to generate an angle-type-key. Other angle-type-key may be generated using the similar approach.

In an embodiment, a length-type-key is generated. The process of generating this type of the key starts from determining the angles as for determining an angle-type-key. Once the angle information is determined, relative lengths of the sides between each corner in the contour are determined. The information about the relative lengths is used to generate a length-type-key. For example, if a contour image depicts a square, then since the square has four edges of the equal length, the information indicating that the edges are equal to each other may be used in generating a length-type-key. According to another example, if a contour image depicts a rectangle that is not a square, then since such a rectangle has two long edges and two short edges, the information indicating that the contour comprises two long edges and two short edges may be used in generating a length-type-key.

In an embodiment, a geometry-based-key is generated. The process of generating this type of the key starts from determining the angles, as described for determining an angle-type-key, and determining the lengths, as described for determining a length-type-key. The information about the angles and the information about the lengths may be used to determine a geometry-based-key.

In an embodiment, an FFT-based-key is generated. The process involves determining complex numbers for the pixels of a contour image, performing the FFT of the complex numbers to generate pairs of {amplitude_component, frequency_component}, determining a subset of pairs containing low frequency components, and generating hash keys from the amplitude components of the pairs in the subset.

Complex numbers for a contour image may be determined using a variety of approaches. For example, a value of the "x" coordinate of a contour in the contour image may be used as a real_component, while a value of the "y" coordinate of the contour in the contour image may be used as an imaginary_component.

A resulting set of pairs, each pair containing a real_component and an imaginary_component, may be processed as described in step 308 of FIG. 3 to produce output containing pairs of {amplitude_component, frequency_component}. The output pairs may be processed to determine a subset of the output pairs that contain low frequency components. The resulting subset of pairs may be processed as described in step 309 of FIG. 3 to produce hash keys.

In an embodiment, each key generated for a contour image may be hashed. Various approaches for hashing the keys may be implemented, and some of the examples were described above.

One of the properties of the keys generated as described above is that the keys are invariant to translation, rotation, scaling and mirroring of an input image. Hence, a particular hash code of the key extracted from a particular contour image is going to be identical to another hash code of the key extracted from a contour image that was obtained from the particular contour image by rotating clockwise, rotating counter-clockwise or mirroring the particular contour image.

In an embodiment, a hash code of a key is generated based on a "shape number" determined for a contour depicted in a contour image. A shape number may be interpreted as an attribute of the contour. A contour depicted in a contour image may have one or more attributes (angles, edge length, and the like), and each of the attributes may have an associated shape number, generated from the value of the attribute. A sequence of the shape numbers may be used to generate a hash code for the contour image.

FIG. 13 illustrated an example code 1300 for transforming attribute information into a shape number. The example code illustrates determining a sequence of numbers describing attributes of a contour depicted in a contour image, and transforming the sequence of the numbers into a shape number.

Referring again to FIG. 11, in step 1110 a determination is made whether all types of keys and all keys for each type have been generated. If so, then the process proceeds to step 316, and they to the subsequent steps 318-320, all of which are described in FIG. 3.

However, if in step 1110 it is determined that all keys have not been determined for a contour image, then the process proceeds to step 1108, and another key of a particular type is generated, or other keys of another type of keys are generated.

VII. Example Implementations

In an embodiment, an approach for extracting keys from digital images is implemented to process a large quantity of images in a relatively short period of time. In some embodiment, the approach allows ultra-fast processing of the images providing the results in much shorter period of time than conventional methods. Processing times between 15 ms and 200 ms have been observed for some embodiments.

The ability to process a large quantity of images in a relatively short period of time allows obtaining the keys for each image very quickly, and thus the images may be automatically classified as similar or dissimilar in a short time interval.

The ability to process a large quantity of images in a relatively short period of time also allows generating various indexes for the images. For example, the keys extracted from the images may be used to generate an inverse index of the images. An inverse index may represent a mapping between each of the keys and one or more images from which a particular key was extracted, a mapping between pairs of keys and one or more images from which the particular pair of keys was extracted, and so forth. Since using the described approach, the keys are generated rapidly, and sorting the keys and associations between the keys and the respective images is not time-consuming, generating the index may be performed very quickly as well.

In an embodiment, an approach for extracting keys from digital images is implemented to determine whether a new image is similar to any of the images that have been already stored in a database of images.

Figure 14:
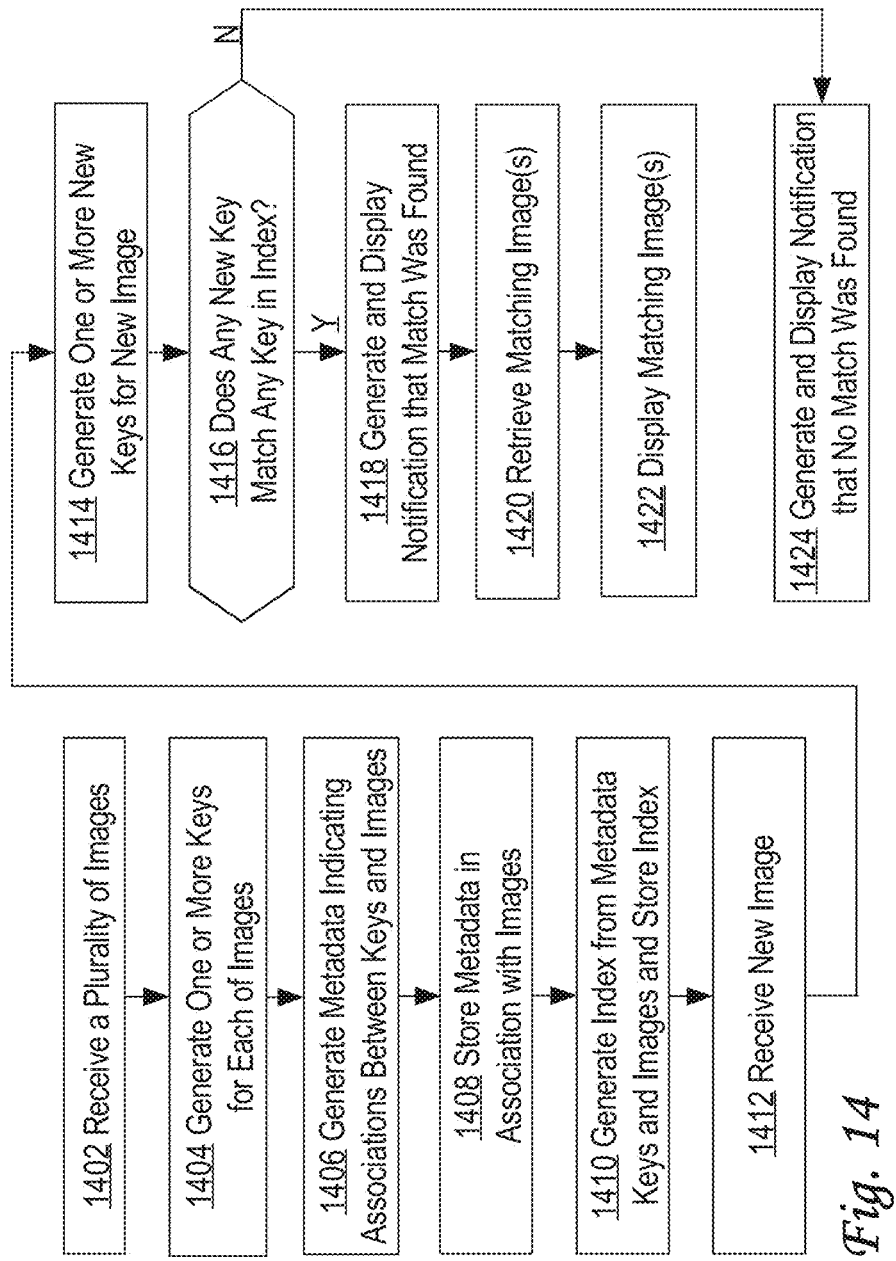
FIG. 14 illustrates an example implementation of a key-extraction method for determining similarities between images.

FIG. 14 illustrates an example implementation of a key-extraction method for determining similarities between images. In step 1402 a plurality of images is received. Each of the plurality of images may be pre-processed, as described in step 304 of FIG. 3.

In step 1404, one or more keys are extracted from each image of the plurality of images. The keys may be extracted using any of the approaches described above.

In step 1406, metadata indicating associations between the keys extracted for each image and the respective images of the plurality of images are generated.

In step 1408, the metadata is stored in association with the respective images.

In step 1410, an index is generated. The index may be generated from the metadata, keys, and images. For example, an inverted index may be generated. The inverted index may contain a plurality of entries, and each entry captures a mapping between a particular key and one or more images from which the particular key was extracted. The index and the corresponding images may be stored in a database.

In step 1412, a new image is received. The image may be received along with a query requesting that the system determines whether the new image is in some sense similar to any of the already processed and stored images.

In step 1414, one or more keys are extracted from the new image using the described approach.

In step 1416, the system determines whether any of the key extracted from the new image matches any of the keys included in the index. The match may be determined by comparing the keys extracted from the new image with the keys that have been already stored in the index, and thus correspond to the keys that have been extracted from the images stored in the database of images. If at least one match is found, then the system proceeds to step 1418. However, if no match is found, then in step 1424, the system generates and displays a message indicating that the new image does not match any of the images stored in the database, and thus the new image is indeed new.

In step 1418, the system generates and displays a notification that the new image matches in some sense at least one image stored in the database.

In step 1420, the system uses the key for which the match was found, and the index of the keys to retrieve one or more images that, based on a key matching, have been determined as similar to the received new image. The retrieved images may be displayed, or the links to the images may be provided. Furthermore, the received new image may also be displayed along with a notification that the received new image appears to be similar in some aspect to at least one image stored in the database of images. This approach is particularly useful in determining if a newly designed image is in any way similar to any of the designs that have been already created and stored in the database of images.

Furthermore, any of the approaches herein may be useful in determining whether a design created by another designer or a competitor may be considered as a similar mark to the design that has been already registered as a trademark.

Any of the approaches herein may also be useful in modifying or fine tuning existing logos and other graphical designs so that they do not appear similar to the already created images. For example, a design that is being newly created may be fine-tuned until the keys extracted from the design do not match any of the keys extracted from the already created images.

Any of the approaches herein may also be used to search a database of images. For example, a query may be issued to the system maintaining a database of images. The query may request proving one or more images that are similar in certain context to a particular image. The query may comprise a link to the particular image. Upon receiving the query, the system may extract one or more keys from the image, and compare the extracted keys with the keys stored in an index generated for the images stored in the database of images. If a match between the extracted keys and the keys stored in the index is found, then the image or images corresponding to the matched keys are provided as a response to the query.

Any of the approaches herein may also be useful in the area of fine arts. For example, a customer may be interested in finding art galleries or auction houses that have an original or a copy of a particular art piece. The customer may issue a query containing an image of the particular art piece, and the system may return the names of the art galleries or auction houses that have the particular art piece. Furthermore, the customer may compare different copies of the particular art piece by determining the count of matching keys between the keys generated from the depiction of the particular art piece and the keys generated from the depiction of the copy owned by a particular art gallery. Using this approach, the customer may select a particular art gallery that owns a copy of the particular art piece that has the highest quality.

Any of the approaches herein may also be useful in organizing images collected by a user or a seller. While managing contents of a small collection of images is usually straightforward, managing contents of thousands of images may become quite challenging. However, by using the described approach, a collector or a seller may organize the images based on groupings, similarities, themes and other attributes. For example, a collector may use the process for extracting keys from the images to generate an inverse key index, and lookup the images using the index.

VIII. Enhancements

In an embodiment, the approach for key extraction is enhanced to process a collage of images. For example, a new design may be created by combining objects from separate images and including the combined objects in one image. If one image contains a depiction of a dog, and another image contains a depiction of a cat, a new design may include a depiction of both the dog and the cat. Using the described approach, keys may be extracted from both images (the image depicting the dog, and the image depicting the cat), and the extracted keys may be associated with the new design that depicts both the dog and the cat.

The approach may also be enhanced to determine keys for a new design obtained by combining more than two designs, overlapping the designs, and other type of processing of the designs.

IX. Implementation Example

Hardware Overview

FIG. 15 is a block diagram that illustrates a computer system 1500 upon which an embodiment of the disclosure may be implemented.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a particular image;
using a computer, determining a plurality of characteristics specific to contents of the particular image;
using the computer, generating, based at least in part on the plurality of characteristics, a plurality of coefficients, wherein each coefficient of the plurality of coefficients comprises a pair containing a first component and a second component;
generating a plurality of values by applying a Forward Fourier Transform to the plurality of coefficients;
selecting, from the plurality of values, a subset of values, each value in the subset satisfying a particular threshold requirement;
based, at least in part on the subset of values, generating one or more keys, each of which uniquely encodes data included in the subset of values;
generating and storing metadata that associates each of the one or more keys with the particular image.

2. The method of claim 1, comprising:
receiving a new image;
generating one or more new-image keys for the new image, each of the one or more new-image keys uniquely encodes contents of the new image;
retrieving the metadata;
determining whether the metadata comprises a particular key, from the one or more keys generated for the particular image, that matches any of the one or more new-image keys generated for the new image;
in response to determining the particular key, generating and displaying a notification indicating that the new image is similar to the particular image in a sense indicated by the particular key.

3. The method of claim 2, comprising:
in response to determining the particular key, retrieving, based on the metadata, the particular image associated with the one or more keys, and displaying the particular image for a user.

4. The method of claim 2, comprising:
generating new metadata that associates each of the one or more new-image keys with the new image;
generating an inverse index comprising both the metadata and the new metadata.

5. The method of claim 1,
wherein the method comprises selecting low frequency components from output generated by the FFT.

6. The method of claim 1, comprising performing on the particular image, before the determining, one or more of: an image resizing, an image aspect-ratio adjustment, a transparency-based color-adjustment, a color accentuation, or a color de-accentuation.

7. The method of claim 1, comprising:
generating, from the particular image, a filtered image in which contours are accentuated, and color values and image gradient values are reduced;
generating, from the particular image, a contour image which represents contours in the image.

8. The method of claim 1, wherein each of the one or more keys is generated as hash values using a seed value.

9. An apparatus comprising:
an image interface unit configured to receive a particular image;
a key generator configured to:
determine a plurality of characteristics specific to contents of the particular image;
generate, based at least in part on the plurality of characteristics, a plurality of coefficients, each coefficient of the plurality of coefficients represented by a pair containing a first component and a second component;
generate a plurality of values by applying a Forward Fourier Transform (FFT) to the plurality of coefficients;
select, from the plurality of values, a subset of values, each value in the subset satisfying a particular threshold requirement;
generate, based at least in part on the subset of values, one or more keys, each of which uniquely encodes data included in the subset of values;
a metadata generator configured to generate and store metadata that associates each of the one or more keys with the particular image.

10. The apparatus of claim 9, wherein the image interface unit is configured to receive a new image;
wherein the key generator is configured to:
generate one or more new-image keys for the new image, each of the one or more new-image keys uniquely encodes contents of the new image;
retrieve the metadata;
determine whether the metadata comprises a particular key, from the one or more keys generated for the particular image, that matches any of the one or more new-image keys generated for the new image;
in response to determining the particular key, generate a notification indicating that the new image is similar to the particular image in a sense indicated by the particular key.

11. The apparatus of claim 10, wherein the image interface unit is configured to:
in response to determining the particular key, retrieve, based on the metadata, the particular image associated with the one or more keys, and display the particular image for a user.

12. The apparatus of claim 10, wherein the image interface unit is configured to:
generate new metadata that associates each of the one or more new-image keys with the new image;
generate an inverse index comprising both the metadata and the new metadata.

13. The apparatus of claim 9,
wherein the key generator is configured to select low frequency components from output generated by the FFT.

14. The apparatus of claim 9, comprising:
an image pre-processor configured to perform on the particular image one or more of: an image resizing, an image aspect-ratio adjustment, a transparency-based color-adjustment, a color accentuation, or a color de-accentuation.

15. The apparatus of claim 9, wherein the key generator is configured to:
generate, from the particular image, a filtered image in which contours are accentuated, and color values and image gradient values are reduced;
generate, from the particular image, a contour image which represents contours in the image.

16. The apparatus of claim 9, wherein each of the one or more keys is generated as hash values using a seed value.

17. A non-transitory computer-readable storage medium storing one or more instructions which, when executed by one or more processors, cause performing:
receiving a particular image;
determining a plurality of characteristics specific to contents of the particular image;
generating, based at least in part on the plurality of characteristics, a plurality of coefficients, each coefficient of the plurality of coefficients represented by a pair containing a first component and a second component;
generating a plurality of values by applying a Forward Fourier Transform (FFT) to the plurality of coefficients;
selecting, from the plurality of values, a subset of values, each value in the subset satisfying a particular threshold requirement;
based, at least in part on the subset of values, generating one or more keys, each of which uniquely encodes data included in the subset of values;
generating and storing metadata that associates each of the one or more keys with the particular image.

18. The non-transitory computer-readable storage medium of claim 17, comprising instructions for:
receiving a new image;
generating one or more new-image keys for the new image, each of the one or more new-image keys uniquely encodes contents of the new image;
retrieving the metadata;
determining whether the metadata comprises a particular key, from the one or more keys generated for the particular image, that matches any of the one or more new-image keys generated for the new image;
in response to determining the particular key, generating a notification indicating that the new image is similar to the particular image in a sense indicated by the particular key.

19. The non-transitory computer-readable storage medium of claim 18, comprising instructions for retrieving based on the metadata, in response to determining the particular key, the particular image associated with the one or more keys, and displaying the particular image for a user.

20. The non-transitory computer-readable storage medium of claim 18, comprising instructions for:
generating new metadata that associates each of the one or more new-image keys with the new image;
generating an inverse index comprising both the metadata and the new metadata.

21. The non-transitory computer-readable storage medium of claim 17,
wherein the non-transitory computer-readable storage medium comprises instructions for selecting low frequency components from output generated by the FFT.

22. The non-transitory computer-readable storage medium of claim 17, comprising instructions for performing on the particular image one or more of: an image resizing, an image aspect-ratio adjustment, a transparency-based color-adjustment, a color accentuation, or a color de-accentuation.

23. The non-transitory computer-readable storage medium of claim 17, comprising instructions for generating, from the particular image, a filtered image in which contours are accentuated, and color values and image gradient values are reduced.

24. The non-transitory computer-readable storage medium of claim 17, comprising instructions for generating, from the particular image, a contour image which represents contours in the image.

25. The non-transitory computer-readable storage medium of claim 17, wherein each of the one or more keys is generated as hash values using a seed value.

26. The non-transitory computer-readable storage medium of claim 17, wherein each of the plurality of characteristics is adjusted based on transparency coefficients associated with pixels of the particular image.

* * * * *